US011912049B2

(12) United States Patent
Ishimoto et al.

(10) Patent No.: US 11,912,049 B2
(45) Date of Patent: Feb. 27, 2024

(54) CARTRIDGE

(71) Applicant: SEIKO EPSON CORPORATION, Tokyo (JP)

(72) Inventors: Akio Ishimoto, Shiojiri (JP); Taishi Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 300 days.

(21) Appl. No.: 17/418,886

(22) PCT Filed: Dec. 23, 2019

(86) PCT No.: PCT/JP2019/050326

§ 371 (c)(1),
(2) Date: Jun. 28, 2021

(87) PCT Pub. No.: WO2020/137961

PCT Pub. Date: Jul. 2, 2020

(65) Prior Publication Data

US 2022/0118783 A1 Apr. 21, 2022

(30) Foreign Application Priority Data

Dec. 26, 2018 (JP) ................................ 2018-243222

(51) Int. Cl.
*B41J 32/02* (2006.01)
*B41J 2/32* (2006.01)

(52) U.S. Cl.
CPC ................ *B41J 32/02* (2013.01); *B41J 2/32* (2013.01)

(58) Field of Classification Search
CPC ..... B41J 32/02; B41J 2/32; B41J 17/28; B41J 3/382
See application file for complete search history.

(56) References Cited

U.S. PATENT DOCUMENTS

| | | | | |
|---|---|---|---|---|
| 5,618,119 | A | 4/1997 | Misu et al. | |
| 2009/0202283 | A1 * | 8/2009 | Kumazaki ................ | B41J 32/02 400/207 |

(Continued)

FOREIGN PATENT DOCUMENTS

| | | | | |
|---|---|---|---|---|
| CN | 111971184 | A | 11/2020 | |
| JP | S63-156762 | U | 10/1988 | |

(Continued)

OTHER PUBLICATIONS

Feb. 10, 2020 International Search Report issued in International Patent Application No. PCT/JP2019/050326.

*Primary Examiner* — Thinh H Nguyen
(74) *Attorney, Agent, or Firm* — Oliff PLC

(57) ABSTRACT

A cartridge is installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case. The cartridge includes a tape path through which the printing tape introduced from the device-side tape introduction port is fed toward the device-side tape ejection port in a state in which the cartridge is installed in the cartridge installation part.

8 Claims, 30 Drawing Sheets

(56) References Cited

U.S. PATENT DOCUMENTS

| | | | |
|---|---|---|---|
| 2012/0027493 | A1 | 2/2012 | Yap et al. |
| 2017/0076183 | A1 | 3/2017 | Kasai |
| 2020/0207131 | A1 | 7/2020 | Ishimoto et al. |
| 2021/0023862 | A1 | 1/2021 | Sasaki et al. |

FOREIGN PATENT DOCUMENTS

| | | | |
|---|---|---|---|
| JP | H03-215066 | A | 9/1991 |
| JP | H08-090877 | A | 4/1996 |
| JP | 2001-253600 | A | 9/2001 |
| JP | 4784045 | B2 | 9/2011 |
| JP | 2017-052233 | A | 3/2017 |
| WO | 2012/015695 | A1 | 2/2012 |
| WO | 2019/189710 | A1 | 10/2019 |

* cited by examiner

CARTRIDGE

TECHNICAL FIELD

The present invention relates to a cartridge to be installed in a tape printing device.

BACKGROUND ART

Conventionally, a cassette case which is installed in a printing tape creation device and in which a tape case accommodating a printing tape is detachably and attachably installed has been known as disclosed in Patent Document 1. The cassette case has a guide groove through which the tape paid out from the tape case is fed.

[Patent Document 1] JP-A-8-090877

DISCLOSURE OF THE INVENTION

In a configuration in which a printing tape to be is printed by a tape printing device is introduced from the outside of the tape printing device, it is necessary to smoothly feed the printing tape inside the tape printing device.

A cartridge according to the present invention is a cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge including: a tape path through which the printing tape introduced from the device-side tape introduction port is fed toward the device-side tape ejection port in a state in which the cartridge is installed in the cartridge installation part.

BEST MODES FOR CARRYING OUT THE INVENTION

Figure 1:
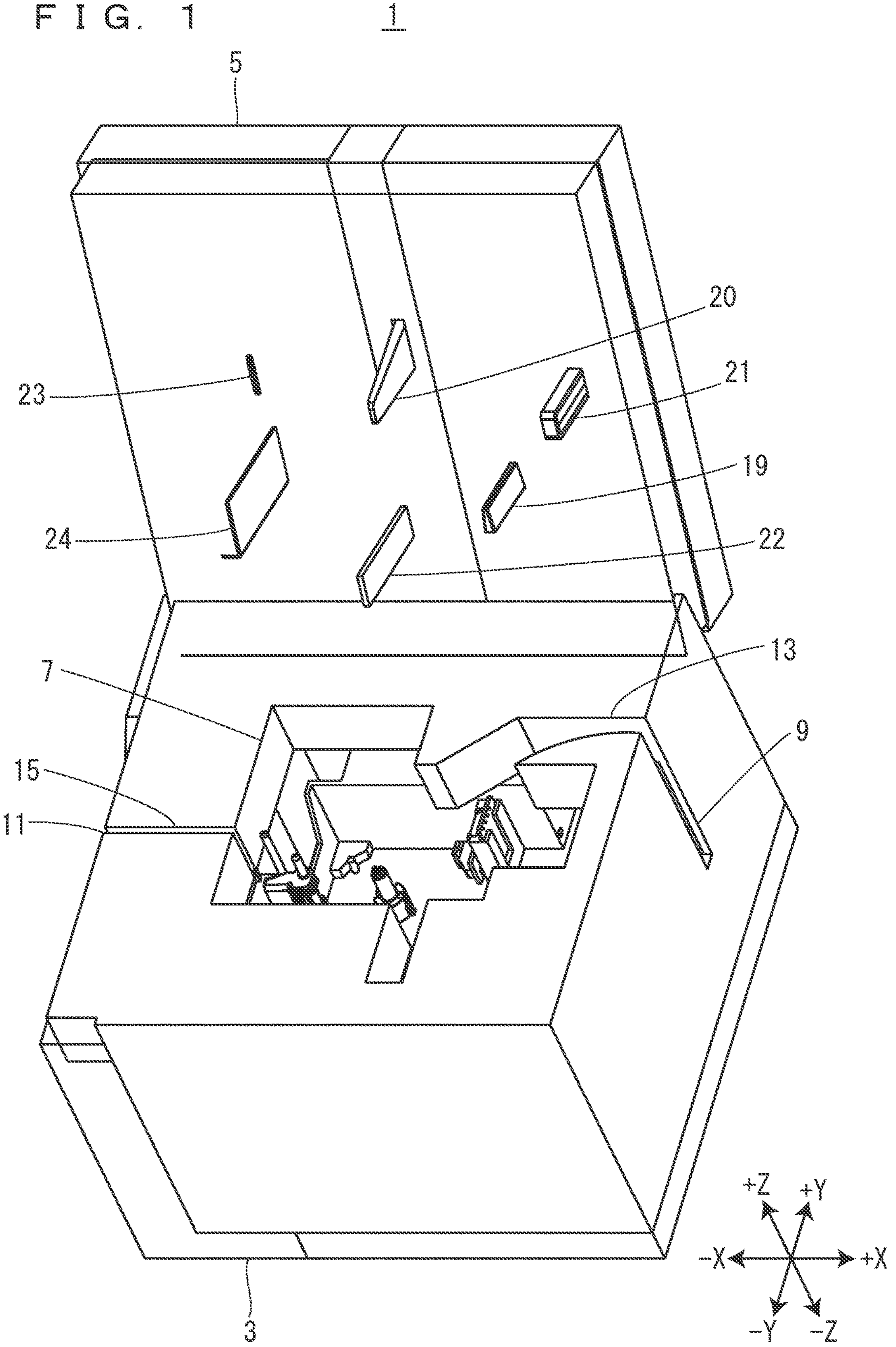
FIG. 1 is a perspective view of a tape printing device.

Directions in the following drawings will be defined. The vertical direction of a tape printing device 1 is defined as a Z direction, a longitudinal direction orthogonal to the Z direction is defined as an X direction, and a cross direction orthogonal to the Z direction and the X direction is defined as a Y direction. In the Z direction, a lower direction or a gravity direction is defined as a −Z direction, and an upper direction is defined as a +Z direction. In the Y direction, one direction is defined as a +Y direction, and a direction opposite to the one direction is defined as a −Y direction. In FIG. 1, the rotational shaft side of an installation-part cover 5 is defined as the +Y direction. In the X direction, one direction is defined as a +X direction, and a direction opposite to the one direction is defined as a −X direction. In FIG. 1, a right side in a plan view is defined as the +X direction. Note that these directions are given only for the convenience of descriptions and do not intend to limit the following embodiments at all as a matter of course.

[Overviews of Tape Printing Device, Tape Cartridge, and Ribbon Cartridge]

The overviews of the tape printing device 1, a tape cartridge 101, and a ribbon cartridge 201 will be described on the basis of FIGS. 1 to 3. In the tape printing device 1, the tape cartridge 101 and the ribbon cartridge 201 are alternatively installed.

Figure 2:
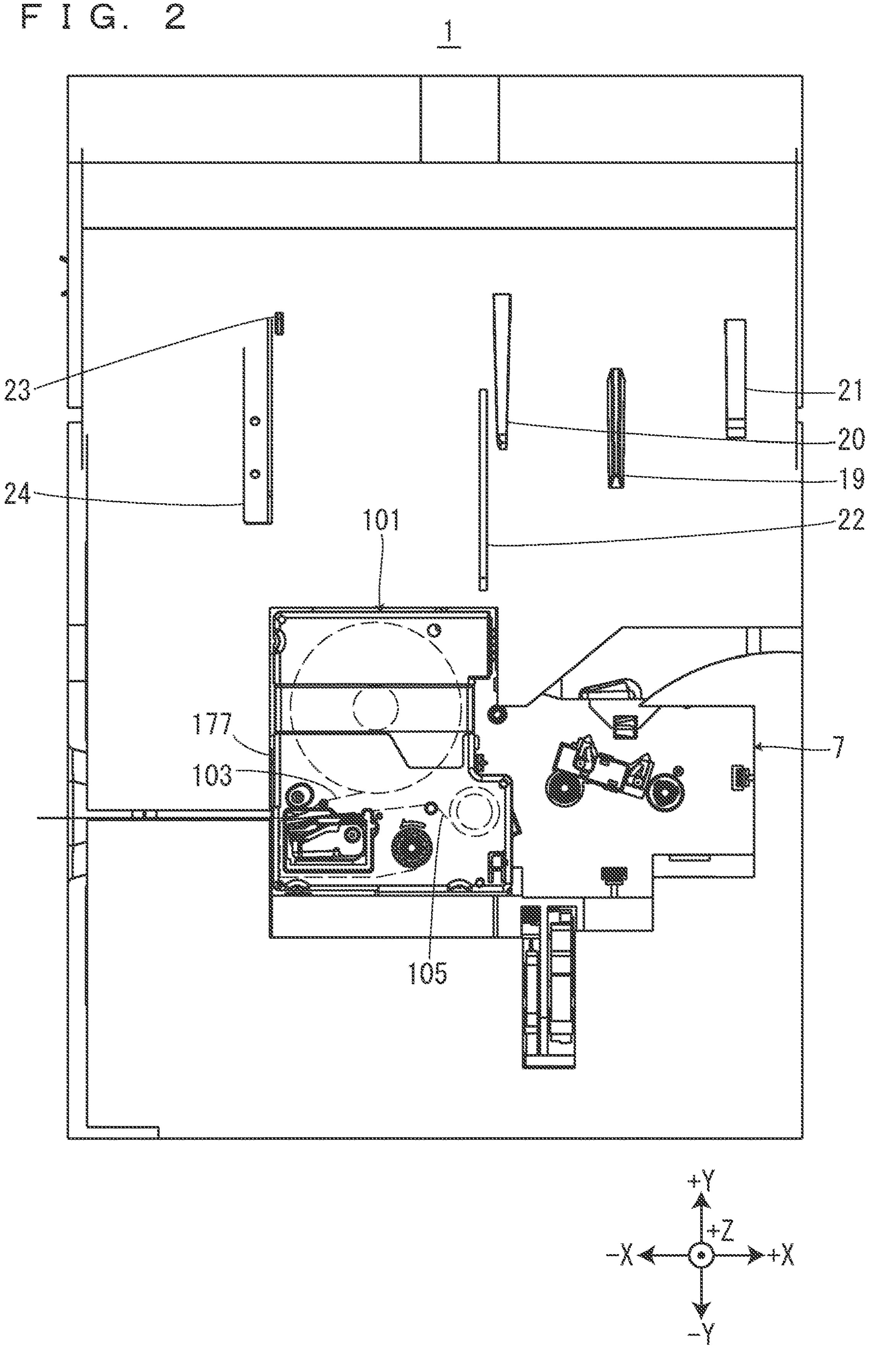
FIG. 2 is a view of the tape printing device with a tape cartridge installed therein when seen from a front side in an installation direction.

As shown in FIG. 2, a first printing tape 103 and a first ink ribbon 105 are accommodated in the tape cartridge 101. In a state in which the tape cartridge 101 is installed in a cartridge installation part 7, the tape printing device 1 performs printing on the first printing tape 103, while feeding the first printing tape 103 and the first ink ribbon 105 accommodated in the tape cartridge 101.

Figure 3:
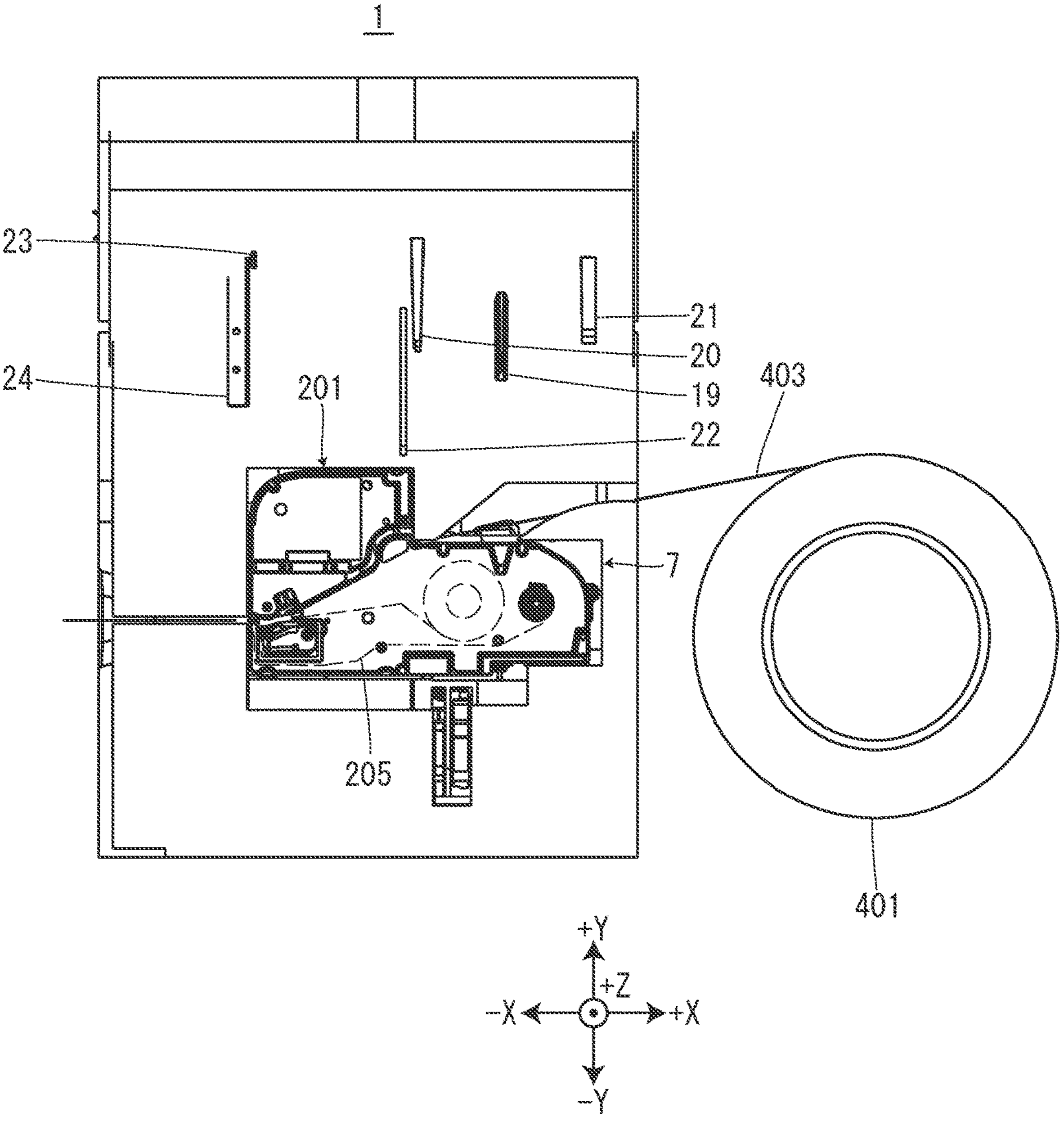
FIG. 3 is a view of the tape printing device with a ribbon cartridge installed therein when seen from the front side in the installation direction.

As shown in FIG. 3, a second ink ribbon 205 is accommodated in the ribbon cartridge 201. In a state in which the ribbon cartridge 201 is installed in the cartridge installation part 7, a second printing tape 403 that has been paid out from a tape roll 401 provided outside the tape printing device 1 is introduced into the tape printing device 1. The tape printing device 1 performs printing on the second printing tape 403, while feeding the introduced second printing tape 403 and the second ink ribbon 205 accommodated in the ribbon cartridge 201.

Note that the length of the second printing tape 403 in the tape roll 401 that has not been used and the length of the second ink ribbon 205 accommodated in the ribbon cartridge 201 that has not been used are not particularly limited but are longer than the length of the first printing tape 103 and the length of the first ink ribbon 105 accommodated in the tape cartridge 101 that has not been used, respectively, in the present embodiment. Therefore, the ribbon cartridge 201 is installed, for example, when large amounts of labels are created at once.

[Tape Printing Device]

Figure 4:
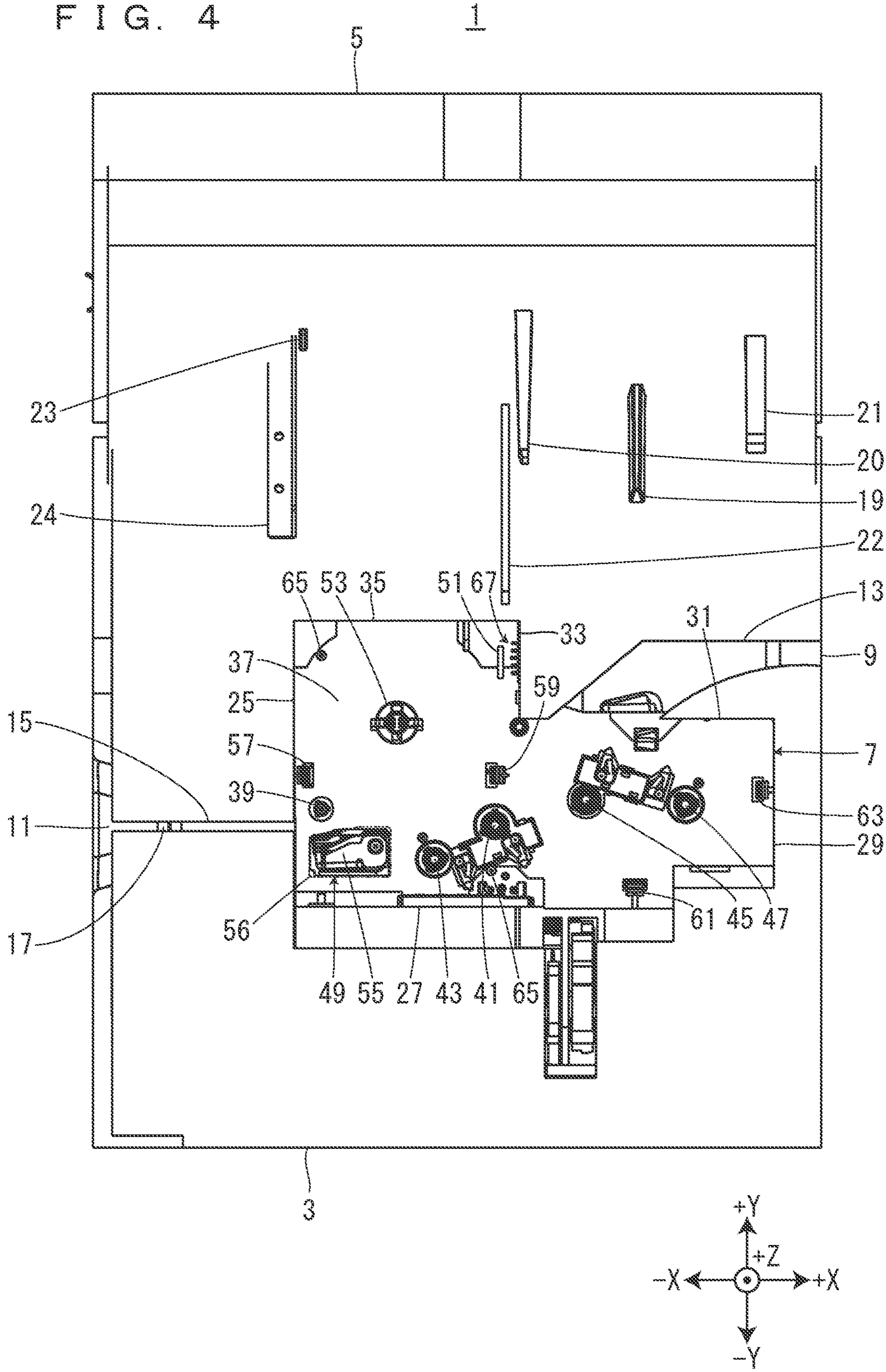
FIG. 4 is a view of the tape printing device when seen from the front side in the installation direction.

The tape printing device 1 will be described on the basis of FIG. 4. The tape printing device 1 includes a device case 3, the installation-part cover 5, and the cartridge installation part 7. The device case 3 is formed into a substantially cuboid shape. The device case 3 has a device-side tape introduction port 9 for the second printing tape 403 paid out from the tape roll 401 on its +X-side surface, and has a device-side tape ejection port 11 shared between the tape cartridge 101 and the ribbon cartridge 201 on its −X-side surface. The device-side tape introduction port 9 introduces the second printing tape 403 from the outside to the inside of the device case 3. The device-side tape ejection port 11 ejects the introduced second printing tape 403 to the outside of the device case 3. Further, the device-side tape ejection port 11 ejects the first printing tape 103 delivered from the tape cartridge 101 installed in the cartridge installation part 7 to the outside of the device case 3. The device-side tape introduction port 9 and the device-side tape ejection port 11 are formed into a slit shape extending in the Z direction. Further, in a tape feeding path inside the tape printing device 1, a direction in which the second printing tape 403 is directed from the device-side tape introduction port 9 to the device-side tape ejection port 11 is defined as a downstream, and a direction opposite to the above direction is defined as an upstream.

The device case 3 has a tape introduction path 13 that connects the device-side tape introduction port 9 and the cartridge installation part 7 to each other. Further, the device case 3 has a tape ejection path 15 that connects the cartridge installation part 7 and the device-side tape ejection port 11 to each other. The tape introduction path 13 and the tape ejection path 15 are formed into a groove shape having an opening on the +Z side. The tape ejection path 15 has a cutter 17. The cutter 17 cuts off the first printing tape 103 or the second printing tape 403 in the tape ejection path 15.

The installation-part cover 5 opens/closes the cartridge installation part 7. The installation-part cover 5 has a first pressing protrusion 19, a second pressing protrusion 20, a third pressing protrusion 21, a fourth pressing protrusion 22, a fifth pressing protrusion 23, and a sixth pressing protrusion 24 on its inside surface. The installation-part cover 5 has a keyboard and a display on its outside surface although not shown in the figure. The keyboard receives input operations to input printing information such as character strings and issue various instructions to perform printing or the like. The display displays various information besides printing information input via the keyboard. The display has a rotation shaft serving as a hinge, and is configured to be accommodatable in the installation-part cover 5. When the display is accommodated in the installation-part cover 5, the display surface of the display faces the keyboard. When the keyboard receives an input operation to perform printing, the tape printing device 1 performs printing processing on the basis of printing information input via the keyboard. Note that the tape printing device 1 may be configured to include input display means such as a touch panel type display instead of the keyboard and the display. Further, the tape printing device 1 may be configured to perform printing processing on the basis of printing data and a command received from an external device such as a personal computer and a smart phone. In other words, a printing system in which the tape printing device 1 and an external device serving as an operation terminal are combined together may be configured. When the tape printing device 1 is configured to be connectable to such an external device, the keyboard and the display may or may not be provided in the tape printing device 1.

The cartridge installation part 7 is formed into a concave shape having an opening on the +Z side. Here, in the inner peripheral surface of the cartridge installation part 7, an inner peripheral surface on the −X side is defined as a first installation inner peripheral surface 25. An inner peripheral surface extending to the +X side from the end on the −Y side of the first installation inner peripheral surface 25 is defined as a second installation inner peripheral surface 27. An inner peripheral surface extending to the +Y side from the end on the +X side of the second installation inner peripheral surface 27 is defined as a third installation inner peripheral surface 29. An inner peripheral surface extending to the −X side from the end on the +Y side of the third installation inner peripheral surface 29 is defined as a fourth installation inner peripheral surface 31. An inner peripheral surface extending to the +Y side from the end on the −X side of the fourth installation inner peripheral surface 31 is defined as a fifth installation inner peripheral surface 33. An inner peripheral surface extending to the −X side from the end on the +Y side of the fifth installation inner peripheral surface 33 is defined as a sixth installation inner peripheral surface 35. The end on the −X side of the sixth installation inner peripheral surface 35 is connected to the end on the +Y side of the first installation inner peripheral surface 25. The downstream end of the tape introduction path 13 opens into the fourth installation inner peripheral surface 31. The upstream end of the tape ejection path 15 opens into the first installation inner peripheral surface 25.

The cartridge installation part 7 has, on its bottom surface, i.e., its −Z-side surface, a platen shaft 39, a first winding shaft 43, a first paying-out shaft 41, a second paying-out shaft 45, and a second winding shaft 47 provided to protrude to the +Z side in an order from the −X side.

The platen shaft 39 has a larger protrusion amount with respect to a front side in an installation direction than the first paying-out shaft 41, the first winding shaft 43, the second paying-out shaft 45, and the second winding shaft 47. When the tape cartridge 101 or the ribbon cartridge 201 is installed in the cartridge installation part 7, the platen shaft 39 is inserted into a first platen roller 109 or a second platen roller 203 that will be described later to guide the installation of the tape cartridge 101 or the ribbon cartridge 201. Note that the installation direction of the tape cartridge 101 and the ribbon cartridge 201 will be simply defined as an "installation direction" below, and the installation direction is parallel to a direction in which the platen shaft 39 extends, i.e., the Z direction. Further, the front side in the installation direction indicates the +Z side, and a back side in the installation direction indicates the −Z side.

Further, the cartridge installation part 7 has, on the installation bottom surface 37, a head part 49, an engagement convex part 51, and an insertion convex part 53 provided to protrude to the front side in the installation direction. The head part 49 is positioned on the −Y side of the platen shaft 39. The head part 49 includes a printing head 55 and a head cover 56 that covers at least the +X side, the −Y side, and the front side in the installation direction of the printing head 55. The printing head 55 is a thermal head including a heat generation element. The head cover 56 is formed into a substantially rectangular shape when seen from the front side in the installation direction. When the tape cartridge 101 or the ribbon cartridge 201 is installed in the cartridge installation part 7, the head cover 56 guides the installation of the tape cartridge 101 or the ribbon cartridge 201 together with the platen shaft 39. In FIG. 4, the head cover 56 is imaginarily indicated by two-dot chain lines in order to show the printing head 55. The engagement convex part 51 is positioned close to a corner part at which the fifth installation inner peripheral surface 33 and the sixth installation inner peripheral surface 35 cross each other, and formed into a plate shape facing the fifth installation inner peripheral surface 33. That is, the engagement convex part 51 is formed into a substantially rectangular shape long in the Y direction when seen from the front side in the installation direction. Further, the engagement convex part 51 protrudes from the installation bottom surface 37 in a cantilevered state. The insertion convex part 53 is positioned at a substantially intermediate part between the engagement convex part 51 and the platen shaft 39, and formed into a substantially-stepped cylindrical shape having a larger diameter on the back side in the installation direction and a smaller diameter on the front side in the installation direction.

In addition, the cartridge installation part 7 has, on the installation bottom surface 37, a first hook 57, a second hook 59, a third hook 61, and a fourth hook 63 provided to protrude to the front side in the installation direction. The first hook 57 is positioned on the +Y side of the platen shaft 39 and at the end on the −X side of the installation bottom surface 37. The second hook 59 is positioned on the +Y side of the first paying-out shaft 41 and at a position facing the first hook 57 in the X direction. The third hook 61 is positioned on the −Y side of a substantially intermediate position between the second paying-out shaft 45 and the second winding shaft 47 and at the end on the −Y side of the installation bottom surface 37. The fourth hook 63 is positioned on the +X side of the second winding shaft 47 and at the end on the +X side of the installation bottom surface 37. Further, the cartridge installation part 7 has, on the installation bottom surface 37, a plurality of positioning pins 65 provided to protrude to the front side in the installation direction.

The cartridge installation part 7 has, on the fifth installation inner peripheral surface 33, a substrate connection part 67 provided to face the engagement convex part 51 on the +X side of the engagement convex part 51. The substrate connection part 67 is connected to a control circuit (not shown) that controls the respective parts of the tape printing device 1.

[Ribbon Cartridge]

Figure 5:
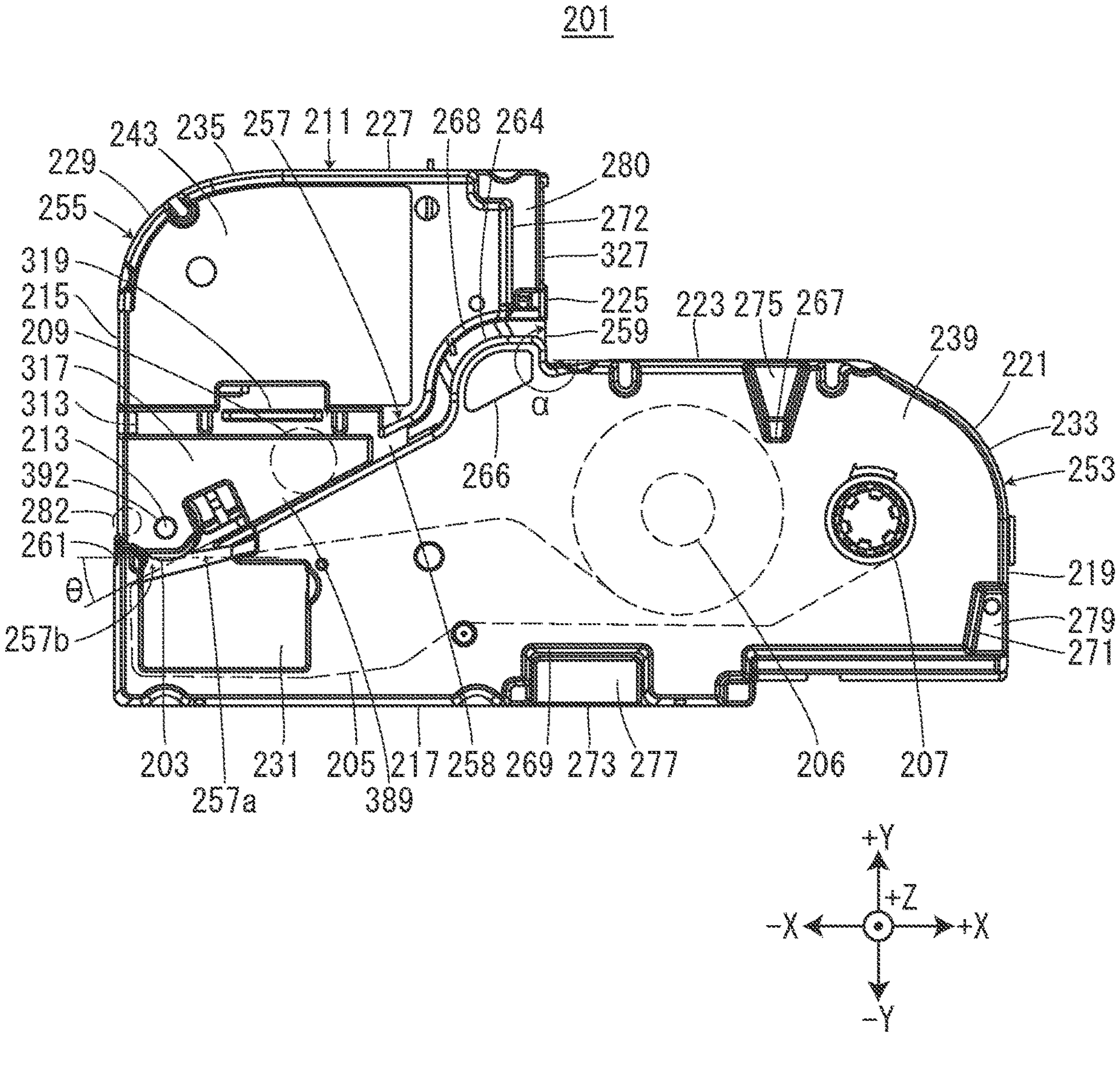
FIG. 5 is a view of the ribbon cartridge when seen from the front side in the installation direction.
Figure 6:
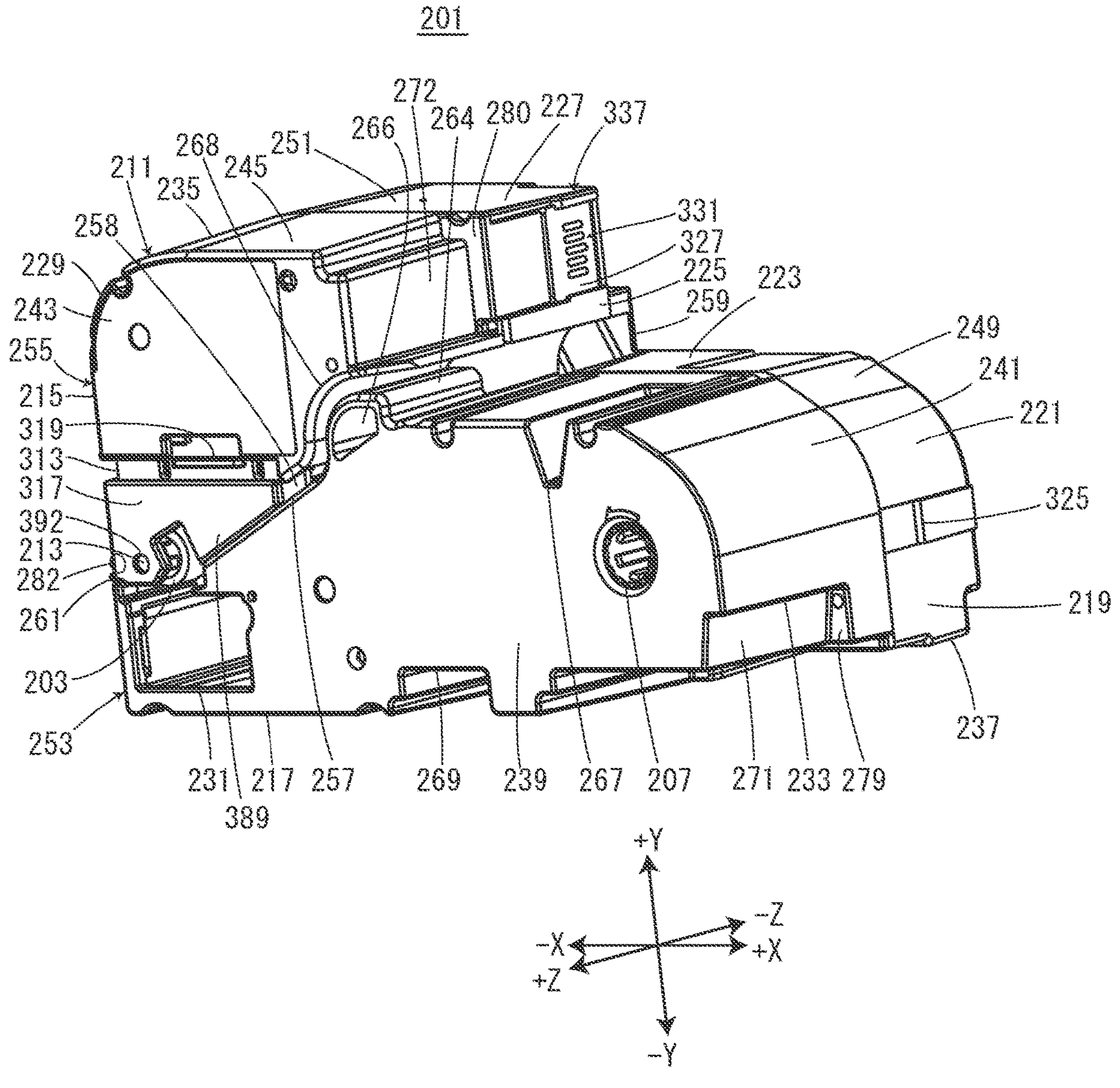
FIG. 6 is a perspective view of the ribbon cartridge.
Figure 7:
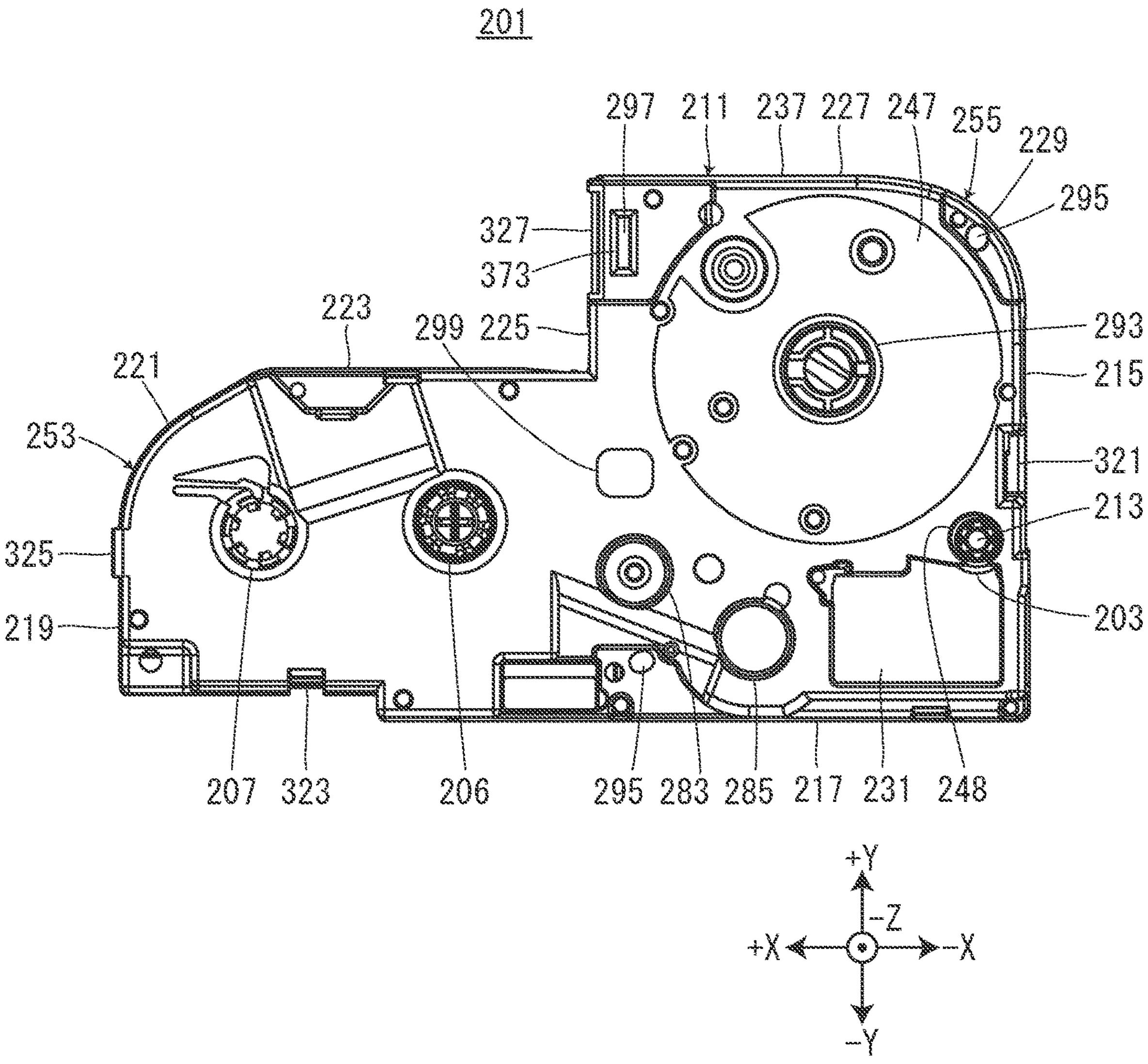
FIG. 7 is a view of the ribbon cartridge when seen from a back side in the installation direction.

The ribbon cartridge 201 will be described on the basis of FIGS. 5 to 7. The ribbon cartridge 201 includes the second platen roller 203, a second paying-out core 206, a second winding core 207, a retention tip end 209, and a second cartridge case 211 that accommodates the second platen roller 203, the second paying-out core 206, the second winding core 207, and the retention tip end 209. The second platen roller 203, the second paying-out core 206, and the second winding core 207 are, when seen from the front side in the installation direction, provided at positions corresponding to the platen shaft 39, the second paying-out shaft 45, and the second winding shaft 47 provided in the cartridge installation part 7, respectively. The second platen roller 203 has a second platen shaft insertion hole 213 penetrating in the installation direction. The second ink ribbon 205 is wound on the second paying-out core 206. The second ink ribbon 205 that has been paid out from the second paying-out core 206 is wound up by the second winding core 207. Note that the second cartridge case 211 includes a plurality of types having different thicknesses, i.e., different dimensions in the installation direction depending on the width of the accommodated second ink ribbon 205.

The second cartridge case 211 is, when seen from the front side in the installation direction, formed into a shape substantially similar to the cartridge installation part 7. In the peripheral wall part of the second cartridge case 211, a peripheral wall part on the −X side is defined as a ribbon-side first peripheral wall part 215. A peripheral wall part extending to the +X side from the end on the −Y side of the ribbon-side first peripheral wall part 215 is defined as a ribbon-side second peripheral wall part 217. A peripheral wall part extending to the +Y side from the end on the +X side of the ribbon-side second peripheral wall part 217 is defined as a ribbon-side third peripheral wall part 219. A peripheral wall part extending to the −X side via a first curvature surface 221 from the end on the +Y side of the ribbon-side third peripheral wall part 219 is defined as a ribbon-side fourth peripheral wall part 223. A peripheral wall part extending to the +Y side from the end on the −X side of the ribbon-side fourth peripheral wall part 223 is defined as a ribbon-side fifth peripheral wall part 225. A peripheral wall part extending to the −X side from the end on the +Y side of the ribbon-side fifth peripheral wall part 225 is defined as a ribbon-side sixth peripheral wall part 227. The end on the −X side of the ribbon-side sixth peripheral wall part 227 is connected to the end on the +Y side of the ribbon-side first peripheral wall part 215 via a second curvature surface 229. Between the ribbon-side fourth peripheral wall part 223 and the ribbon-side sixth peripheral wall part 227, a step is formed by the ribbon-side fifth peripheral wall part 225. Further, an internal angle α formed between the ribbon-side fourth peripheral wall part 223 and the ribbon-side fifth peripheral wall part 225 exceeds 180° and is, for example, approximately 270° when seen from the front side in the installation direction.

The second cartridge case 211 has a second head insertion hole 231 provided to penetrate in the installation direction. The second head insertion hole 231 is, when seen from the front side in the installation direction, positioned at a corner part at which the ribbon-side first peripheral wall part 215 and the ribbon-side second peripheral wall part 217 cross each other. The second head insertion hole 231 is arranged along the ribbon-side first peripheral wall part 215 and the ribbon-side second peripheral wall part 217. The second head insertion hole 231 is, when seen from the front side in the installation direction, formed into a shape corresponding to the head cover 56, i.e., a substantially rectangular shape. When the ribbon cartridge 201 is attached to and detached from the cartridge installation part 7, the second head insertion hole 231 and the second platen shaft insertion hole 213 position the ribbon cartridge 201 and guide the attachment and detachment of the ribbon cartridge 201.

The second cartridge case 211 includes a front-side case and a second back-side case 237. The front-side case is divided into a ribbon-part front-side case 233 and a tape-retention-part front-side case 235. Note that the ribbon-part front-side case 233 is an example of a first case, the tape-retention-part front-side case 235 is an example of a second case, and the second back-side case 237 is an example of a third case. When the ribbon cartridge 201 is installed in the cartridge installation part 7, the ribbon-part front-side case 233 and the tape-retention-part front-side case 235 are arranged on the front side in the installation direction, while the second back-side case 237 is arranged on the back side in the installation direction. The ribbon-part front-side case 233 and the tape-retention-part front-side case 235 are resin-molded articles having translucency, and the second back-side case 237 is a resin-molded article having no translucency. However, the materials and manufacturing methods of the ribbon-part front-side case 233, the tape-retention-part front-side case 235, and the second back-side case 237 are not limited to those described above.

The ribbon-part front-side case 233 includes a ribbon-part front-side wall part 239 and a ribbon-part front-side peripheral wall part 241 protruding to the back side in the installation direction from the peripheral edge part of the ribbon-part front-side wall part 239. The tape-retention-part front-side case 235 includes a tape-retention-part front-side wall part 243 and a tape-retention-part front-side peripheral wall part 245 protruding to the back side in the installation direction from the peripheral edge part of the tape-retention-part front-side wall part 243. The second back-side case 237 includes a second back wall part 247 and a ribbon-part back-side peripheral wall part 249 and a tape-retention-part back-side peripheral wall part 251 protruding to the front side in the installation direction from the second back wall part 247.

Figure 8:
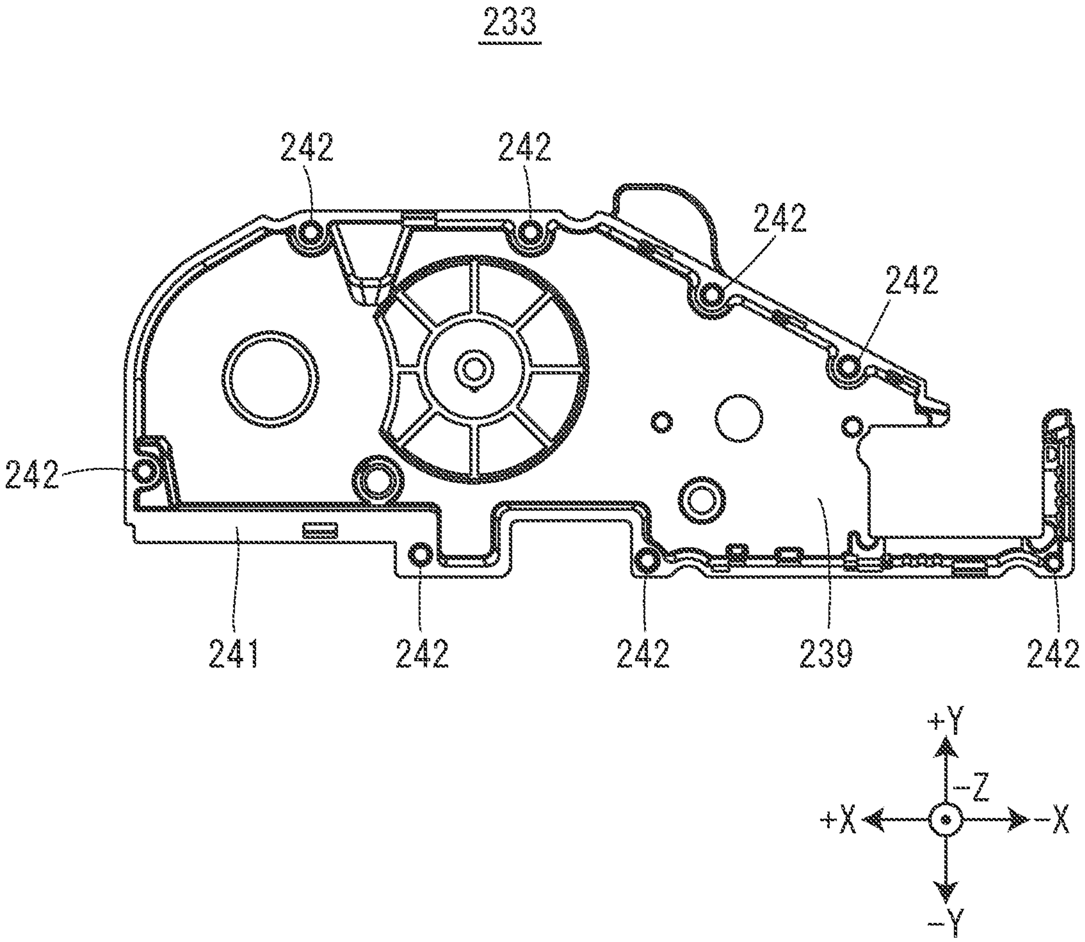
FIG. 8 is a view of a ribbon-part front-side case when seen from the back side in the installation direction.

The ribbon-part front-side case 233 and the second back-side case 237 are combined together so as to make the ribbon-part front-side peripheral wall part 241 and the ribbon-part back-side peripheral wall part 249 butted against each other, and constitute the outer shell of an ink ribbon accommodation part 253 that accommodates the second ink ribbon 205. That is, the ribbon-part front-side peripheral wall part 241 has a plurality of ribbon-part insertion pins 242 (see FIG. 8) protruding to the back side in the installation direction, and the ribbon-part back-side peripheral wall part 249 has a plurality of ribbon-part insertion holes 250 (see FIG. 10) open to the front side in the installation direction. The ribbon-part front-side case 233 and the second back-side case 237 are combined together by the insertion of the ribbon-part insertion pins 242 into the ribbon-part insertion holes 250.

The tape-retention-part front-side case 235 and the second back-side case 237 are combined together so as to make the tape-retention-part front-side peripheral wall part 245 and the tape-retention-part back-side peripheral wall part 251 butted against each other, and constitute the outer shell of a tape-retention-mechanism accommodation part 255 that accommodates the second platen roller 203 and the retention tip end 209. That is, the tape-retention-part front-side peripheral wall part 245 has a plurality of retention-part insertion pins 246 (see FIG. 9) protruding to the back side in the installation direction, and the tape-retention-part back-side peripheral wall part 251 has a plurality of retention-part insertion holes 252 (see FIG. 10) open to the front side in the installation direction. The tape-retention-part front-side case 235 and the second back-side case 237 are combined together by the insertion of the retention-part insertion pins 246 into the retention-part insertion holes 252. The end on the back side in the installation direction of the second platen roller 203 engages a back-side roller engagement part 248 provided on the second back wall part 247, and the end on the front side in the installation direction of the second platen roller 203 engages a front-side roller engagement part 392 provided on a slide plate 313 that will be described later. An ink ribbon accommodation part 253 and the tape-retention-mechanism accommodation part 255 are integrally formed via the second back wall part 247. Note that a tape retention part 305 (see FIG. 10) accommodated in the tape-retention-mechanism accommodation part 255 will be described later.

The ribbon-part front-side case 233 has a first peripheral wall concave part 267, a second peripheral wall concave part 269, a third peripheral wall concave part 271, and a fourth peripheral wall concave part 272. The first peripheral wall concave part 267 is formed into a concave shape from the ribbon-part front-side wall part 239 to the back side in the installation direction at the end on the +X side of the ribbon-side fourth peripheral wall part 223. The second peripheral wall concave part 269 is formed into a groove shape extending in the installation direction at the substantially intermediate part in the X direction of the ribbon-side second peripheral wall part 217. The third peripheral wall concave part 271 is formed into a concave shape from the ribbon-part front-side wall part 239 to the back side in the installation direction at the end on the −Y side of the ribbon-side third peripheral wall part 219. The fourth peripheral wall concave part 272 is formed into a concave shape from the tape-retention-part front-side wall part 243 to the back side in the installation direction at the end on the +Y side of the ribbon-side fifth peripheral wall part 225. Further, the ribbon-part back-side peripheral wall part 249 has a peripheral wall convex part 273 provided to protrude to the front side in the installation direction at its position corresponding to the second peripheral wall concave part 269.

Here, the bottom surface of the first peripheral wall concave part 267, the protrusion tip end surface of the peripheral wall convex part 273, and the bottom surface of the third peripheral wall concave part 271 are defined as a first pressing part 275, a second pressing part 277, and a third pressing part 279, respectively. The first pressing part 275, the second pressing part 277, and the third pressing part 279 are, when seen from the front side in the installation direction, provided to surround the second paying-out core

206 and the second winding core 207. The first pressing part 275, the second pressing part 277, and the third pressing part 279 are provided at positions corresponding to the first pressing protrusion 19, the second pressing protrusion 20, and the third pressing protrusion 21 provided on the installation-part cover 5, respectively. Further, the bottom surface of the fourth peripheral wall concave part 272 and the surface on the front side in the installation direction on the +Z side of the cartridge-side tape ejection port 261 are defined as a fourth pressing part 280 and a fifth pressing part 282, respectively. The fourth pressing part 280 and the fifth pressing part 282 are provided at positions corresponding to the fourth pressing protrusion 22 and the fifth pressing protrusion 23 provided on the installation-part cover 5, respectively.

When the installation-part cover 5 is closed in a state in which the ribbon cartridge 201 is installed in the cartridge installation part 7, the first pressing protrusion 19, the second pressing protrusion 20, and the third pressing protrusion 21 provided on the installation-part cover 5 are guided by the first peripheral wall concave part 267, the second peripheral wall concave part 269, and the third peripheral wall concave part 271, respectively, and butted against the first pressing part 275, the second pressing part 277, and the third pressing part 279, respectively. That is, the peripheries of the second paying-out core 206 and the second winding core 207 are pressed by the first pressing protrusion 19, the second pressing protrusion 20, and the third pressing protrusion 21. Thus, the second paying-out core 206 and the second winding core 207 are prevented from being inclined with respect to the second paying-out shaft 45 and the second winding shaft 47 provided in the cartridge installation part 7, respectively. Accordingly, it is possible to prevent the second ink ribbon 205 from becoming wrinkled when the second ink ribbon 205 is fed from the second paying-out core 206 to the second winding core 207.

Note that the ribbon cartridge 201 is allowed to accommodate an ink ribbon having a large ink ribbon width, for example, an ink ribbon having a width of 50 mm. Meanwhile, in order to accommodate an ink ribbon having an ink ribbon width smaller than 50 mm, for example, an ink ribbon having a width of 24 mm or less, the ribbon cartridge 201 may be one in which the ribbon-part front-side case 233 and the tape-retention-part front-side case 235 are reduced in dimension in the Z direction. At this time, both or any one of the first pressing protrusion 19 and the third pressing protrusion 21 may press the ribbon-part front-side wall part 239 without the provision of both or any one of the first peripheral wall concave part 267 and the third peripheral wall concave part 271.

Further, when the installation-part cover 5 is closed in a state in which the ribbon cartridge 201 is installed in the cartridge installation part 7, the fourth pressing protrusion 22 provided on the installation-part cover 5 is guided by the fourth peripheral wall concave part 272 and butted against the fourth pressing part 280. Thus, the fourth pressing part 280 is pressed to the back side in the installation direction by the fourth pressing protrusion 22 to allow a second electrode part 330 of a second circuit substrate 327 provided in the vicinity of the fourth pressing part 280 to properly come in contact with contact terminal parts 83. Further, when the installation-part cover 5 is closed in a state in which the ribbon cartridge 201 is installed in the cartridge installation part 7, the fifth pressing protrusion 23 provided on the installation-part cover 5 is butted against the fifth pressing part 282. Thus, the fifth pressing part 282 is pressed to the back side in the installation direction by the fifth pressing protrusion 23 to allow the second platen roller 203 provided in the vicinity of the fifth pressing part 282 to properly face the printing head 55.

In the ribbon-part back-side peripheral wall part 249, the ribbon-side first peripheral wall part 215 has a ribbon-side first hook engagement part 321, a ribbon-side second peripheral wall part 217 has a ribbon-side second hook engagement part 323, and the ribbon-side third peripheral wall part 219 has a ribbon-side third hook engagement part 325. In a state in which the ribbon cartridge 201 is installed in the cartridge installation part 7, the ribbon-side first hook engagement part 321, the ribbon-side second hook engagement part 323, and the ribbon-side third hook engagement part 325 provided in the ribbon cartridge 201 engage the first hook 57, the third hook 61, and the fourth hook 63 provided in the cartridge installation part 7, respectively. Thus, the ribbon cartridge 201 is prevented from being installed in a state of floating from the installation bottom surface 37.

On the other hand, the second back wall part 247 has a hook insertion hole 299 formed on the +Y side of a paying-out-side cylindrical part 283 that will be described later. In a state in which the ribbon cartridge 201 is installed in the cartridge installation part 7, the second hook 59 provided in the cartridge installation part 7 is inserted into the hook insertion hole 299 provided on the ribbon cartridge 201. Thus, the second hook 59 is prevented from interfering with the ribbon cartridge 201 when the ribbon cartridge 201 is installed in the cartridge installation part 7.

The second back wall part 247 has a plurality of second positioning holes 295 provided on its surface on the back side in the installation direction. In a state in which the ribbon cartridge 201 is installed in the cartridge installation part 7, the second positioning holes 295 provided on the ribbon cartridge 201 engage the positioning pins 65 provided in the cartridge installation part 7. Thus, the ribbon cartridge 201 is positioned with respect to the cartridge installation part 7.

Further, the second circuit substrate 327 is attached to the ribbon-side fifth peripheral wall part 225 in the ribbon-part back-side peripheral wall part 249. That is, the second circuit substrate 327 is attached to the ribbon-side fifth peripheral wall part 225 provided to be substantially parallel to the ribbon-side first peripheral wall part 215 having the cartridge-side tape ejection port 261. The ribbon-side fifth peripheral wall part 225 has a second substrate attachment part 337 to which the second circuit substrate 327 is attached.

As described above, the ribbon-side fifth peripheral wall part 225 is, when seen from the front side in the installation direction, bent with the internal angle α exceeding 180° with respect to the ribbon-side fourth peripheral wall part 223. Therefore, when the ribbon cartridge 201 falls down onto a floor or the like, the first curvature surface 221 between the ribbon-side third peripheral wall part 219 and the ribbon-side fourth peripheral wall part 223 or a corner part at which the ribbon-side fifth peripheral wall part 225 and the ribbon-side sixth peripheral wall part 227 cross each other are butted against the floor or the like, while the ribbon-side fourth peripheral wall part 223 and the ribbon-side fifth peripheral wall part 225 are prevented from being butted against the floor or the like. Accordingly, when the ribbon cartridge 201 falls down onto a floor or the like, the second electrode part 330 provided on the second circuit substrate 327 is prevented from being butted against the floor or the like. As a result, it is possible to prevent the second electrode part 330 having weak mechanical strength from being damaged. Note that the same function and effect are obtainable even with a configuration in which the second circuit substrate 327 is attached to the ribbon-side fourth peripheral wall part 223.

Figure 10:
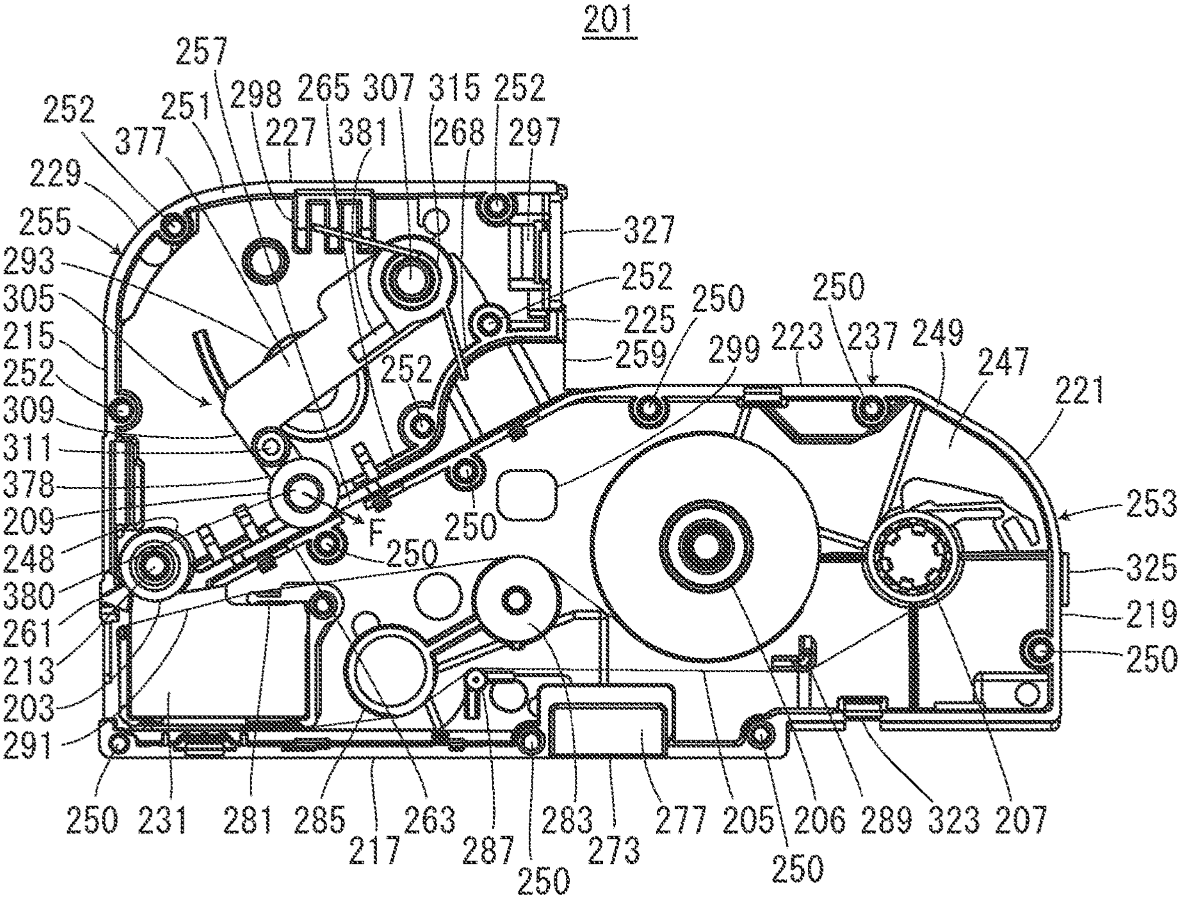
FIG. 10 is a view of the ribbon cartridge with the ribbon-part front-side case, the tape-retention-part front-side case, and a slide plate removed therefrom in a state in which the slide plate is moved to a closing position when seen from the front side in the installation direction.
Figure 10:
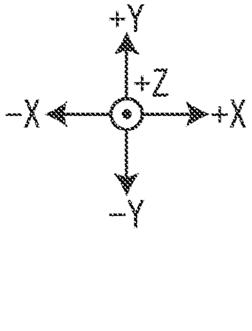
Figure 11:
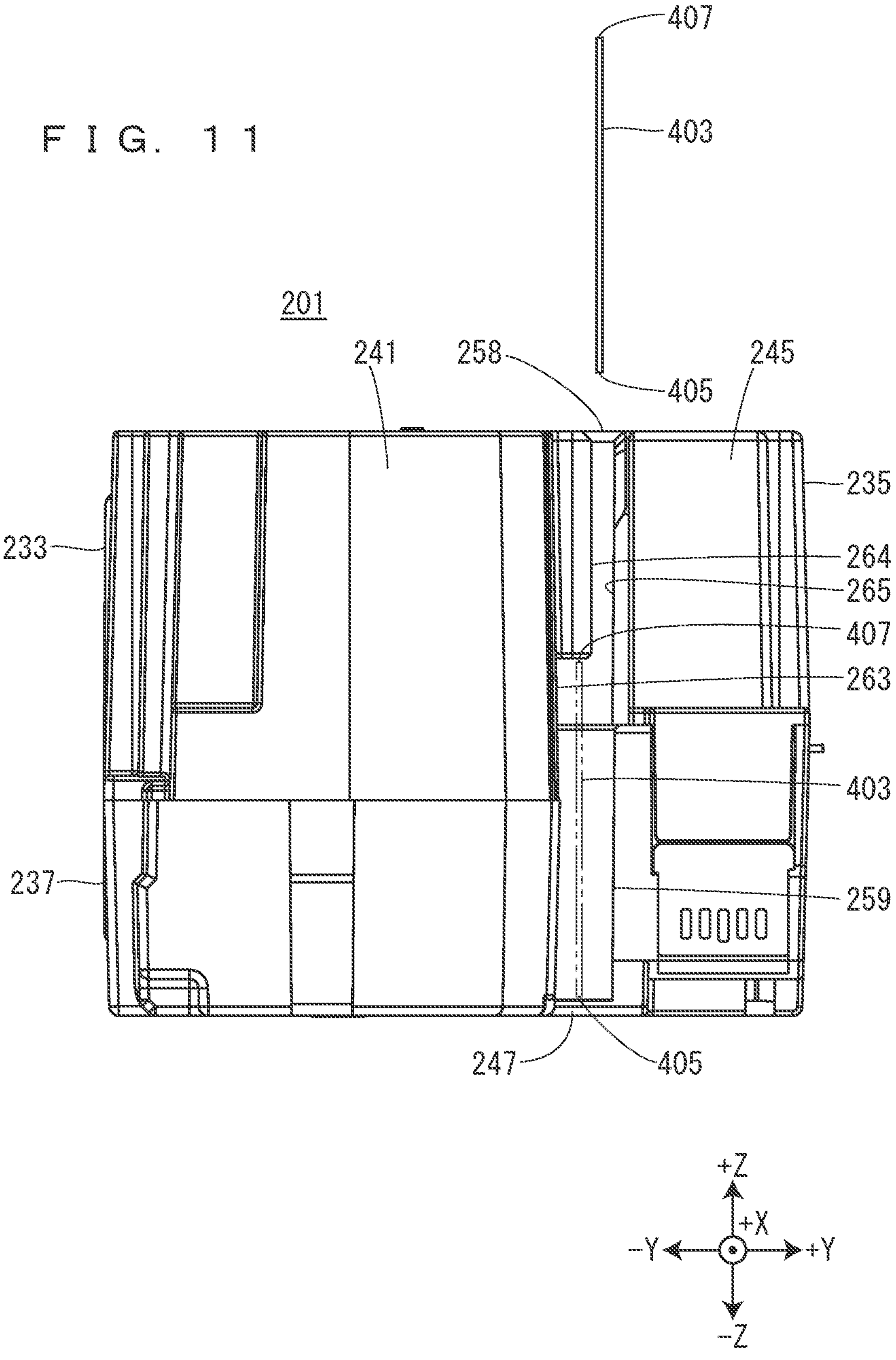
FIG. 11 is a view of the ribbon cartridge when seen from the side of a cartridge-side tape introduction port.
Figure 18:
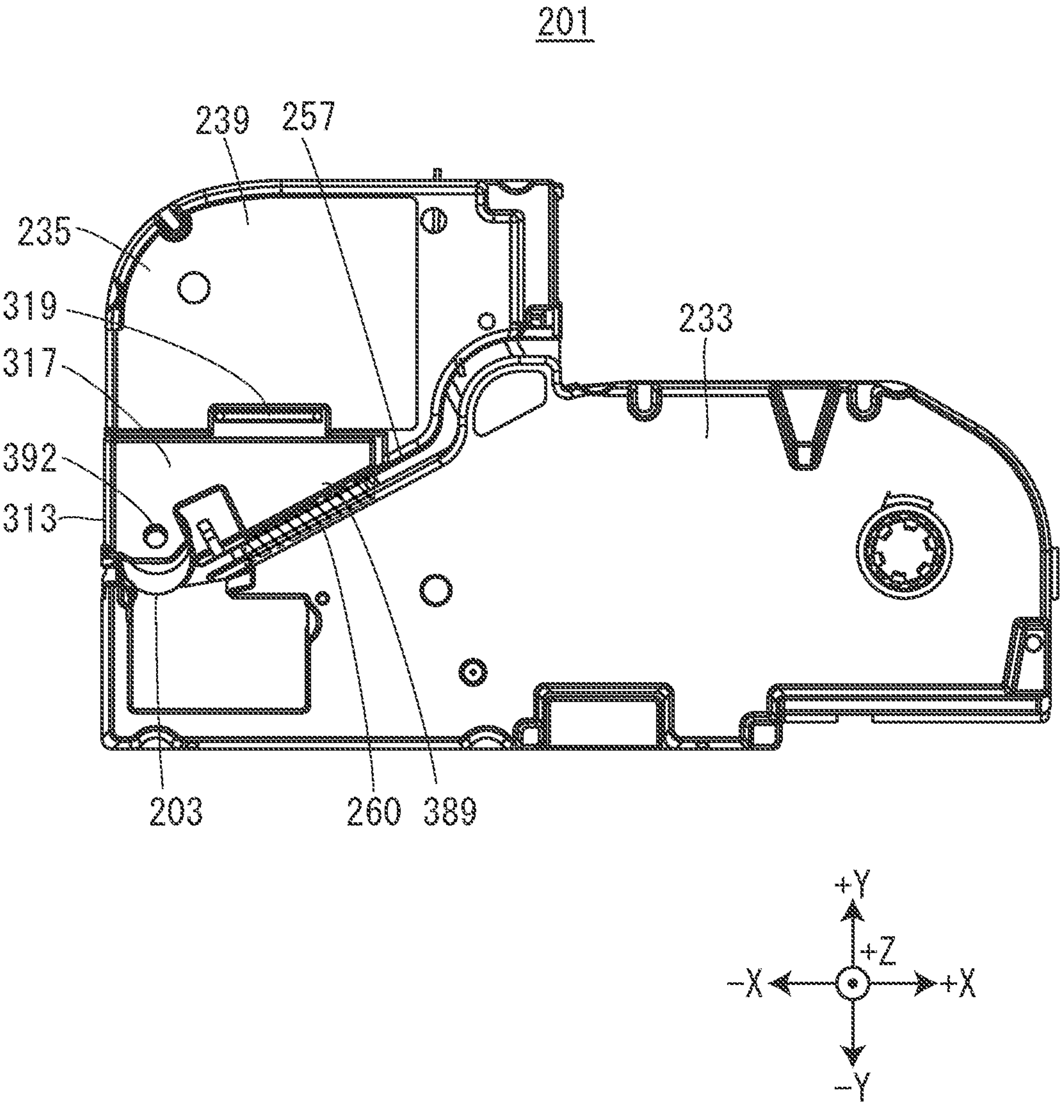
FIG. 18 is a view of the ribbon cartridge in a state in which the slide plate is moved to an opening position when seen from the front side in the installation direction.

A second tape path 257 will be described on the basis of FIGS. 5, 6, and 10. The second tape path 257 is positioned between the ribbon-part front-side case 233 and the tape-retention-part front-side case 235, and formed into a groove shape having an opening on the front side in the installation direction. That is, a set opening part 258 is provided on the front side in the installation direction of the second tape path 257. The set opening part 258 is used when a user sets the second printing tape 403 in the second tape path 257 from a first width end surface 405 (see FIG. 11) that is the end surface on the back side in the installation direction of the second printing tape 403. Note that the second printing tape 403 before being set in the second tape path 257 and the second printing tape 403 after being set in the second tape path 257 are indicated by solid lines and two-dot dashed lines in FIG. 11, respectively. Further, in the set opening part 258, a region to be opened and closed by an opening opening/closing part 389 that will be described later is defined as an opening/closing region 260 (see FIG. 18). In FIG. 18, the opening/closing region 260 is indicated by oblique lines for the convenience of illustration. Note that the opening/closing region 260 is not limited to a configuration that covers a part of the set opening part 258 as in the present embodiment but may cover the entirety of the set opening part 258. That is, the opening opening/closing part 389 may be either a configuration that opens/closes a part of the set opening part 258 or a configuration that opens/closes the entirety of the set opening part 258.

The second tape path 257 connects a cartridge-side tape introduction port 259 provided on the ribbon-side fifth peripheral wall part 225 and the cartridge-side tape ejection port 261 provided on the ribbon-side first peripheral wall part 215 to each other. Note that the cartridge-side tape introduction port 259 is provided between the ink ribbon accommodation part 253 and the second circuit substrate 327 that will be described later. That is, the cartridge-side tape introduction port 259 is positioned on a side closer to the ribbon-side fourth peripheral wall part 223 than the second circuit substrate 327. In FIGS. 5 and 10, the cartridge-side tape introduction port 259 is provided at a region crossing the ribbon-side fourth peripheral wall part 223 at a distance from the second circuit substrate 327 of the ribbon-side fifth peripheral wall part 225. The cartridge-side tape introduction port 259 may be provided on the ribbon-side fourth peripheral wall part 223. In this case, in order to make a simple arrangement structure, the cartridge-side tape introduction port 259 is preferably close to a region crossing the ribbon-side fifth peripheral wall part 225 and the ribbon-side fourth peripheral wall part 223.

The cartridge-side tape introduction port 259 introduces the second printing tape 403 that has been introduced from the device-side tape introduction port 9 into the second cartridge case 211 in a state in which the ribbon cartridge 201 is installed in the cartridge installation part 7. The cartridge-side tape ejection port 261 ejects the second printing tape 403 to the outside of the second cartridge case 211 toward the device-side tape ejection port 11 in a state in which the ribbon cartridge 201 is installed in the cartridge installation part 7. The cartridge-side tape introduction port 259 and the cartridge-side tape ejection port 261 are formed into a slit shape along the installation direction (see FIGS. 11 and 12). Therefore, the second printing tape 403 that has been introduced into the second cartridge case 211 is fed with its width direction substantially parallel to the installation direction.

In the lateral wall part of the second tape path 257, the lateral wall part on the side of the ink ribbon accommodation part 253 and the lateral wall part on the side of the tape-retention-mechanism accommodation part 255 are defined as a ribbon-side path lateral wall part 263 and a tape-retention-mechanism-side path lateral wall part 265, respectively. The ribbon-side path lateral wall part 263 and the tape-retention-mechanism-side path lateral wall part 265 face each other.

In the vicinity of the cartridge-side tape introduction port 259 of the second tape path 257, an introduction-side guide part 264 protrudes from the ribbon-side path lateral wall part 263 to the tape-retention-mechanism-side path lateral wall part 265. The introduction-side guide part 264 comes in contact with a second width end surface 407 (see FIG. 11) that is the end surface on the front side in the installation direction of the second printing tape 403 that has been introduced into the second tape path 257, and guides the second printing tape 403 in the width direction of the second printing tape 403. That is, the second printing tape 403 is set in the second tape path 257 with the second width end surface 407 positioned on a side closer to the back side in the installation direction than the introduction-side guide part 264. Note that the ribbon-side path lateral wall part 263 is an example of a "first path lateral wall part." The tape-retention-mechanism-side path lateral wall part 265 is an example of a "second path lateral wall part." The introduction-side guide part 264 is an example of a "tape guide part."

Figure 12:
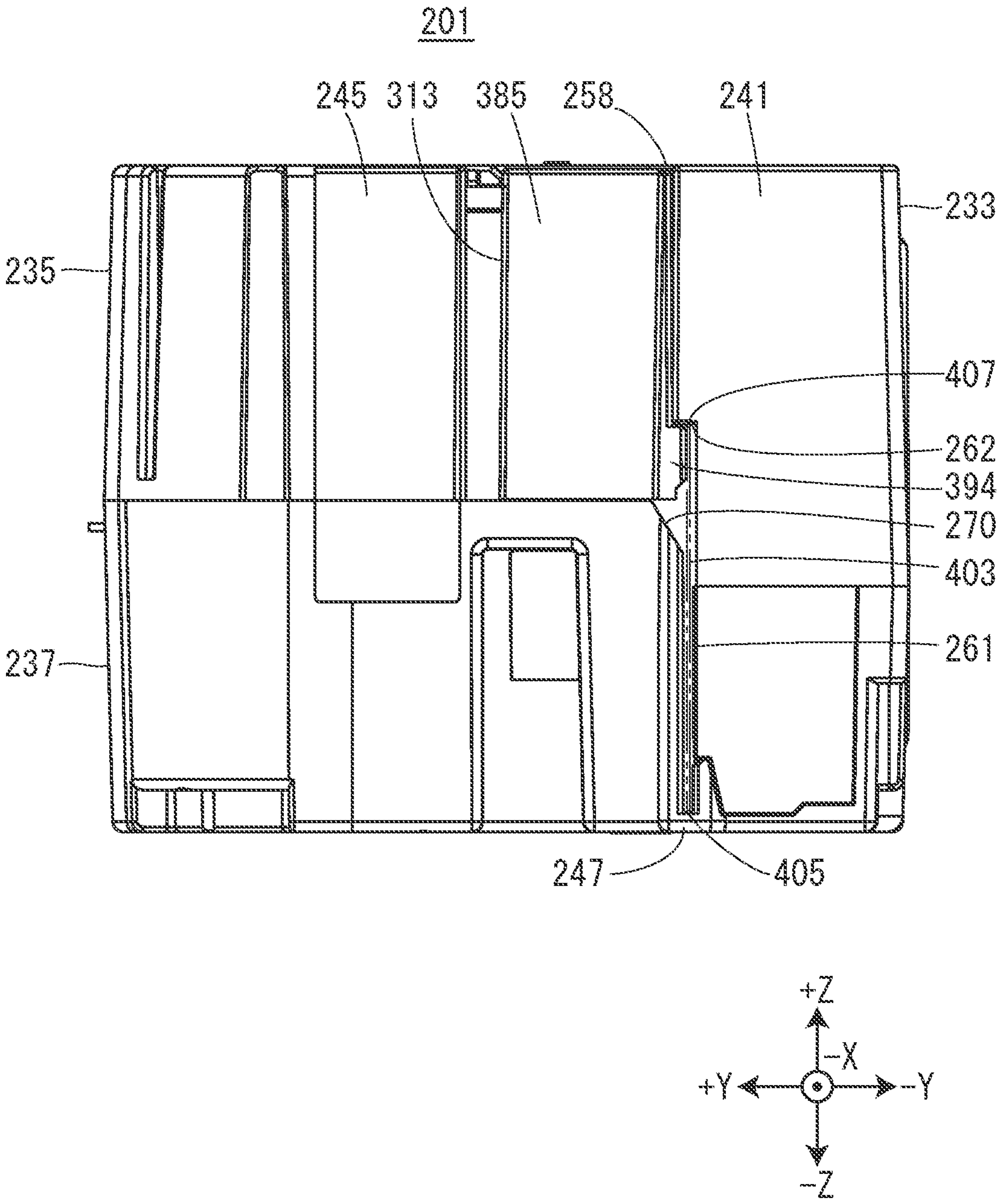
FIG. 12 is a view of the ribbon cartridge in a state in which the slide plate is moved to the closing position when seen from the side of a cartridge-side tape ejection port.

On the other hand, the edge surface on the front side in the installation direction of the cartridge-side tape ejection port 261 functions as an ejection-side guide part 262 (see FIG. 12). The ejection-side guide part 262 comes in contact with the second width end surface 407 of the second printing tape 403 that has been introduced into the second tape path 257 and guides the second printing tape 403 in the width direction of the second printing tape 403. Therefore, the second printing tape 403 is fed in the second tape path 257 with the first width end surface 405 guided by the second back wall part 247 and the second width end surface 407 guided by the introduction-side guide part 264 and the ejection-side guide part 262. Note that the cartridge-side tape ejection port 261 is provided to be shifted to the −Y side with respect to the set opening part 258. Therefore, the ejection-side guide part 262 has, at its edge part on the +Y side, a tape guide inclination surface 270 that guides the second printing tape 403 that has been inserted from the set opening part 258 to the cartridge-side tape ejection port 261.

The introduction-side guide part 264 has a tape visual recognition part 266. The tape visual recognition part 266 is constituted by a concave part provided on a surface on the front side in the installation direction. Since the tape visual recognition part 266 has a wall thickness thinner in the installation direction than other parts of the introduction-side guide part 264, the user is allowed to visually recognize the second printing tape 403 that has been set in the second tape path 257 through the tape visual recognition part 266. Thus, the user is allowed to confirm whether the second printing tape 403 has been set at an appropriate set position, i.e., whether the second printing tape 403 has been set at a position at which the second width end surface 407 comes in contact with the introduction-side guide part 264. Note that the tape visual recognition part 266 may be constituted by, for example, a concave part provided on the surface on the back side in the installation direction of the introduction-side guide part 264, and the introduction-side guide part 264 may be constituted by a hole penetrating in the installation direction.

The tape-retention-mechanism-side path lateral wall part 265 has, at its position facing the introduction-side guide part 264, a widened part 268 widened to the +Y side, i.e., a side opposite to the ribbon-side path lateral wall part 263. Therefore, when the user sets the second printing tape 403 in the second tape path 257 from the set opening part 258, it is possible to prevent the introduction-side guide part 264 protruding from the ribbon-side path lateral wall part 263 from obstructing the second printing tape 403. Further, the widened part 268 is formed into a curved shape when seen from the front side in the installation direction. Therefore, compared with a configuration in which the widened part 268 is formed into a crank shape, it is possible to prevent the second printing tape 403 from being bent at the widened part 268 when the second printing tape 403 is set in the second tape path 257 from the set opening part 258.

On the second tape path 257, the second platen roller 203 and the retention tip end 209 are provided in an order close to the cartridge-side tape ejection port 261. In the tape-retention-mechanism-side path lateral wall part 265, a portion corresponding to the retention tip end 209 is notched so that the retention tip end 209 is capable of retaining the second printing tape 403 that has been introduced into the second tape path 257 between the retention tip end 209 and the ribbon-side path lateral wall part 263. Further, the end on the side of the cartridge-side tape ejection port 261 of the second tape path 257 is connected to the second head insertion hole 231 via a second ribbon exposure part 291 that will be described later.

In the second tape path 257, a side closer to the cartridge-side tape introduction port 259 than the second platen roller 203 is defined as an introduction-side path 257*a*, and a side closer to the cartridge-side tape ejection port 261 than the second platen roller 203 is defined as an ejection-side path 257*b*. The ejection-side path 257*b* is bent with respect to the introduction-side path 257*a*, and preferably has a bending angle θ (see FIG. 5) of 21° or more and 42° or less. Since the ejection-side path 257*b* has a bending angle θ of 21° or more, the contact area between the second printing tape 403 and the second platen roller 203 is increased. Therefore, it is possible to stably feed the second printing tape 403. Further, since the ejection-side path 257*b* has a bending angle θ of 42° or less, it is possible to prevent the second printing tape 403 from forming bending tendency. Further, the introduction-side path 257*a* introduces the second printing tape 403 to a printing position at an optimum entering angle at which the second printing tape 403 avoids coming in contact with the second hook 59 and the insertion convex part 53 provided on the installation bottom surface 37. Specifically, the entering angle becomes 21° or more and 42° or less with respect to the longitudinal direction of the ribbon cartridge 201, i.e., the X direction when the introduction-side path 257*a* is seen from the front side in the installation direction. The introduction-side path 257*a* shown in FIG. 5 is designed to have an entering angle within the range, but the entering angle is particularly preferably 25° or more and 30° or less. Note that the printing position here indicates a position at which the second platen roller 203 and the printing head 55 sandwich the second ink ribbon 205 and the second printing tape 403 therebetween. In the present embodiment, the entering angle of the introduction-side path 257*a* is substantially equal to the bending angle θ since the ejection-side path 257*b* is substantially parallel to the longitudinal direction of the ribbon cartridge 201. However, the entering angle is not limited to the bending angle θ.

Figure 9:
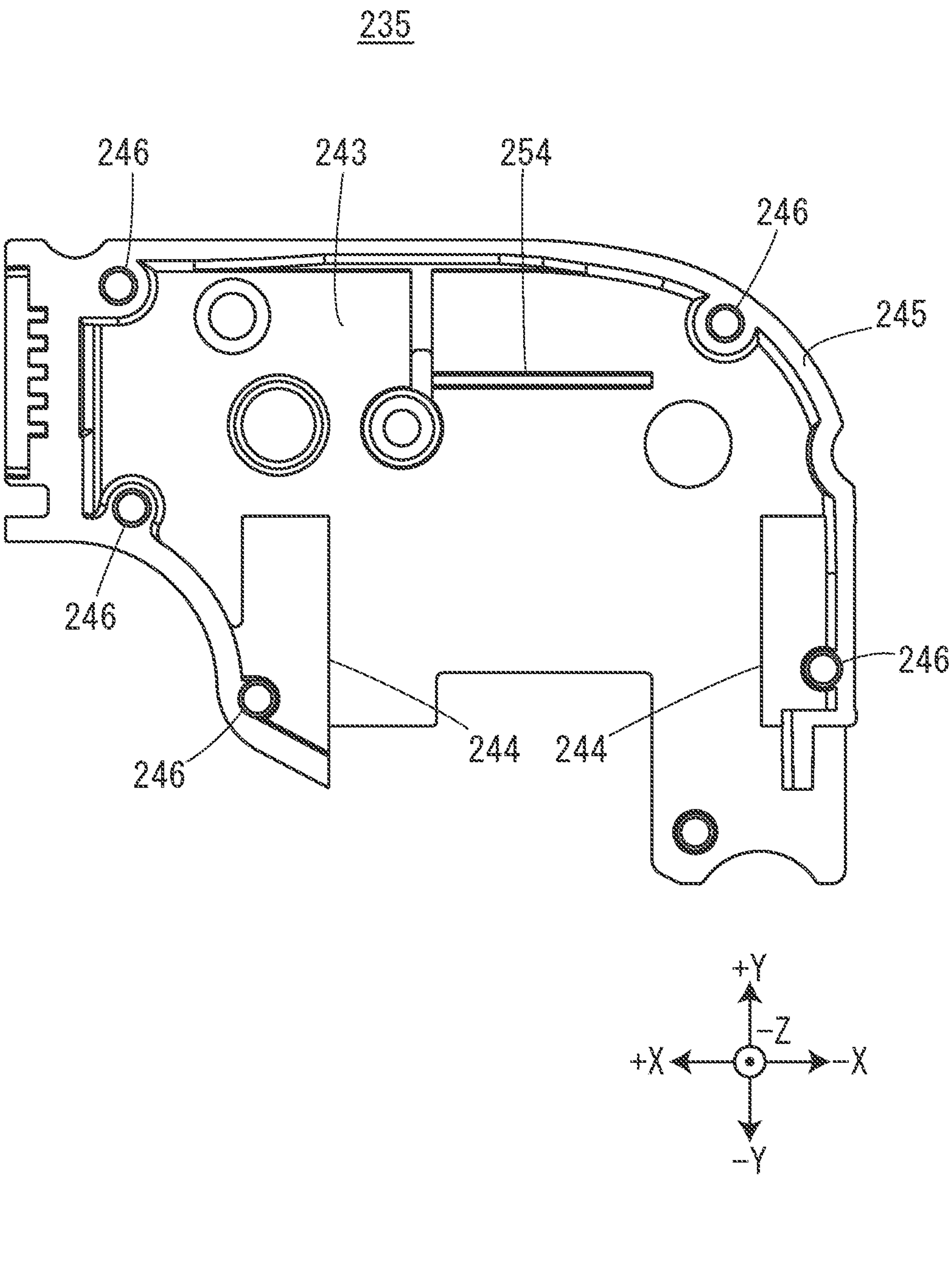
FIG. 9 is a view of a tape-retention-part front-side case when seen from the back side in the installation direction.

The tape-retention-part front-side case 235 will be described on the basis of FIG. 9. The tape-retention-part front-side wall part 243 has two slide guide parts 244 and a case-side engagement part 254 on its inside surface, i.e., a surface on the back side in the installation direction. The two slide guide parts 244 are arranged side by side in the X direction. Guide insertion parts 388 that will be described later are inserted into the slide guide parts 244 from the −Y side. The slide guide parts 244 extend in the Y direction and guide the movement of the guide insertion parts 388 in the Y direction. The case-side engagement part 254 protrudes to the back side in the installation direction, and is formed into a substantially rectangular shape elongated in the X direction when seen from the back side in the installation direction. The case-side engagement part 254 engages a plate-side engagement part 395 that will be described later.

The second back-side case 237 will be described on the basis of FIG. 10. The second back-side case 237 has, on the second back wall part 247, a second head peripheral edge convex part 281, a paying-out-side cylindrical part 283, a winding-side cylindrical part 285, a first ribbon guide 287, and a second ribbon guide 289 provided to protrude to the front side in the installation direction. The second head peripheral edge convex part 281 is provided at the peripheral edge part of the second head insertion hole 231. The second head peripheral edge convex part 281 is notched on the +Y side, i.e., at its part on the side of the second platen roller 203, and the notched portion serves as the second ribbon exposure part 291 at which the second ink ribbon 205 is exposed. Thus, in a state in which the ribbon cartridge 201 is installed in the cartridge installation part 7, the printing head 55 inserted into the second head insertion hole 231 faces the second platen roller 203 across the second ink ribbon 205 and the second printing tape 403.

The paying-out-side cylindrical part 283 and the winding-side cylindrical part 285 are, when seen from the front side in the installation direction, provided at positions corresponding to the first paying-out shaft 41 and the first winding shaft 43 provided in the cartridge installation part 7, respectively. In a state in which the ribbon cartridge 201 is installed in the cartridge installation part 7, the first paying-out shaft 41 and the first winding shaft 43 provided in the cartridge installation part 7 are inserted into the paying-out-side cylindrical part 283 and the winding-side cylindrical part 285 provided in the ribbon cartridge 201, respectively. Thus, the first paying-out shaft 41 and the first winding shaft 43 are prevented from interfering with the ribbon cartridge 201 when the ribbon cartridge 201 is installed in the cartridge installation part 7.

The second ink ribbon 205 that has been paid out from the second paying-out core 206 is wound up by the second winding core 207, while being guided by the paying-out-side cylindrical part 283, the second head peripheral edge convex part 281, the winding-side cylindrical part 285, the first ribbon guide 287, and the second ribbon guide 289 in this order. That is, the paying-out-side cylindrical part 283 and the winding-side cylindrical part 285 function as guide members that guide the second ink ribbon 205, besides receiving the first paying-out shaft 41 and the first winding shaft 43.

Further, the second back wall part 247 has a second cylindrical shaft part 293 provided to protrude to the front side in the installation direction. The second cylindrical shaft part 293 is formed into a substantially-stepped cylindrical shape. In a state in which the ribbon cartridge 201 is installed in the cartridge installation part 7, the insertion convex part 53 provided in the cartridge installation part 7 is inserted into the second cylindrical shaft part 293 provided in the ribbon cartridge 201.

The second back wall part 247 has a second convex-part reception part 297 at a corner part at which the ribbon-side fifth peripheral wall part 225 and the ribbon-side sixth peripheral wall part 227 cross each other. In a state in which the ribbon cartridge 201 is installed in the cartridge installation part 7, the second convex-part reception part 297 provided in the ribbon cartridge 201 receives the engagement convex part 51 provided in the cartridge installation part 7. Further, the second convex-part reception part 297 has, on the −X side, a case-side spring hooking part 298 provided to protrude to the front side in the installation direction from the second back wall part 247. On the case-side spring hooking part 298, one end of a tape retention spring 315 that will be described later is hooked.

[Printing Processing Performed when Ribbon Cartridge is Installed]

Figure 13:
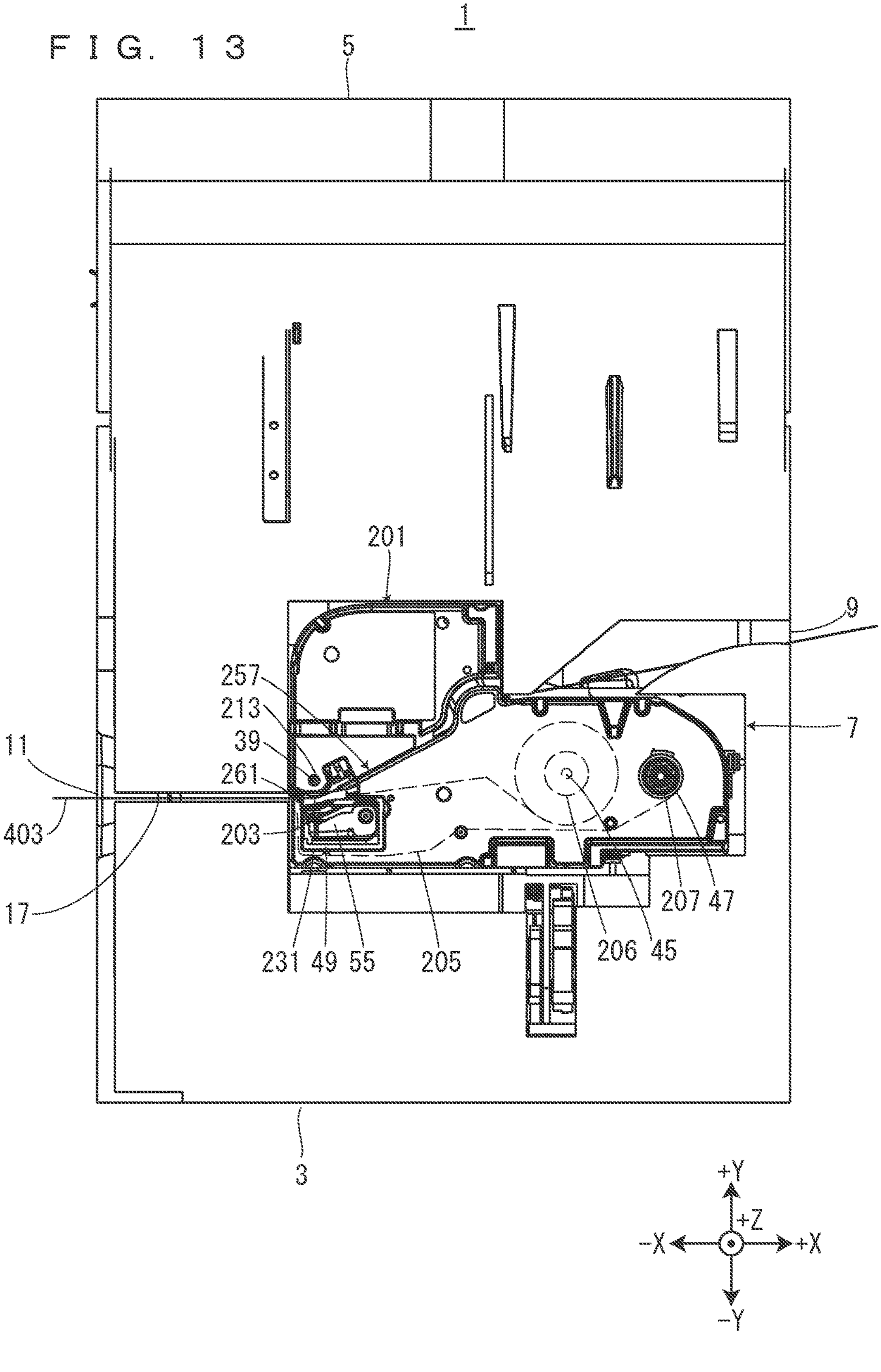
FIG. 13 is a view for describing printing processing performed by the tape printing device in a state in which the ribbon cartridge is installed in a cartridge installation part.

Printing processing performed by the tape printing device 1 in a state in which the ribbon cartridge 201 is installed in the cartridge installation part 7 will be described on the basis of FIG. 13. In a state in which the ribbon cartridge 201 is installed in the cartridge installation part 7, the platen shaft 39, the second paying-out shaft 45, and the second winding shaft 47 provided in the cartridge installation part 7 are inserted into the second platen shaft insertion hole 213 of the second platen roller 203, the second paying-out core 206, and the second winding core 207 provided in the ribbon cartridge 201, respectively. Thus, the driving force of a feeding motor provided in the tape printing device 1 becomes transmissible to the second platen roller 203, the second paying-out core 206, and the second winding core 207.

Further, in a state in which the ribbon cartridge 201 is installed in the cartridge installation part 7, the head part 49 provided in the cartridge installation part 7 is inserted into the second head insertion hole 231 provided on the ribbon cartridge 201. When the installation-part cover 5 is closed after the installation of the ribbon cartridge 201 in the cartridge installation part 7, the printing head 55 is caused to move to the platen shaft 39 by a head movement mechanism not shown. Thus, the second printing tape 403 and the second ink ribbon 205 are sandwiched between the printing head 55 and the second platen roller 203.

When the feeding motor rotates in a normal direction in this state, the second platen roller 203 rotates in a normal direction and the second winding core 207 rotates in a winding direction. Thus, the second printing tape 403 that has been introduced from the device-side tape introduction port 9 is fed to the device-side tape ejection port 11, and the second ink ribbon 205 that has been paid out from the second paying-out core 206 is wound up by the second winding core 207.

Further, when the feeding motor rotates in a reverse direction, the second platen roller 203 rotates in a reverse direction and the second paying-out core 206 rotates in a rewinding direction. Thus, the second printing tape 403 that has been ejected from the cartridge-side tape ejection port 261 is returned to the inside of the second cartridge case 211, and the second ink ribbon 205 that has been paid out from the second paying-out core 206 is rewound by the second paying-out core 206. As described above, the second paying-out shaft 45 inserted into the second paying-out core 206 and the second winding shaft 47 inserted into the second winding core 207 constitute a second ink ribbon transportation mechanism that feeds the second ink ribbon 205.

By rotating the feeding motor in the normal direction and heating the printing head 55, the tape printing device 1 prints printing information input via the keyboard or the like on the second printing tape 403 while feeding the second printing tape 403 and the second ink ribbon 205. After the completion of the printing, the tape printing device 1 causes the cutter 17 to perform a cutting operation to cut off a printed portion of the second printing tape 403. Then, by rotating the feeding motor in the reverse direction, the tape printing device 1 returns the second printing tape 403 until the tip end of the second printing tape 403 comes to the vicinity of a position at which the tip end is sandwiched between the printing head 55 and the second platen roller 203. Thus, it is possible to reduce a margin to be created on the front side in the length direction of the second printing tape 403 that is to be next printed.

[Tape Retention Part]

The tape retention part 305 will be described on the basis of FIG. 10 and FIGS. 14 to 23. The tape retention part 305 is used to retain the second printing tape 403 that has been introduced into the second tape path 257 in advance when the ribbon cartridge 201 is installed in the cartridge installation part 7. As shown in FIG. 10, the tape retention part 305 includes an arm supporting shaft 307, an arm part 309, the tape retention spring 315, the retention tip end 209, and a slide plate 313 (see FIG. 18).

Figure 14:
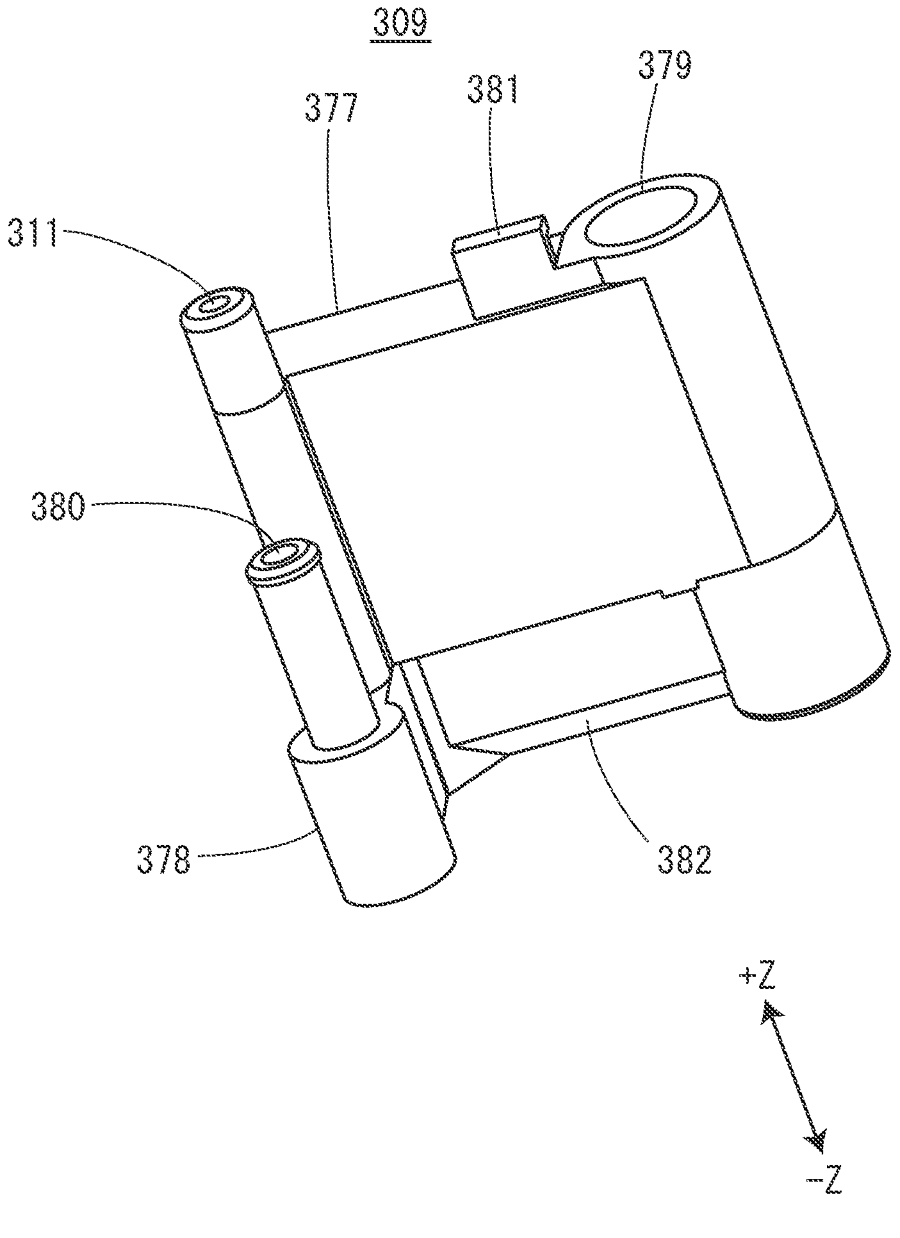
FIG. 14 is a perspective view of an arm part.

The arm supporting shaft 307 protrudes to the front side in the installation direction from the second back wall part 247. The arm part 309 is formed into a substantially "L"-shape when seen from the front side in the installation direction. As shown in FIGS. 10 and 14, the arm part 309 includes an arm body 377, an arm tip end 378, a support shaft insertion hole 379, an engagement pin 311, a tip end pin 380, an arm-side spring hooking part 381, and an engagement inclination surface 382.

The arm body 377 is formed into a substantially cuboid shape. The arm body 377 has, at one end in its longitudinal direction when seen from the front side in the installation direction, a support shaft insertion hole 379 provided to penetrate in the installation direction. The arm body 377 has, at the other end in the longitudinal direction when seen from the front side in the installation direction, an arm tip end 378 provided to protrude toward the second tape path 257. The arm supporting shaft 307 is inserted into the support shaft insertion hole 379. The arm tip end 378 has the engagement pin 311 and the tip end pin 380 provided to protrude to the front side in the installation direction in an order close to the arm body 377. The engagement pin 311 is positioned on the +Y side of an arm engagement part 391 that will be described later, and engages the arm engagement part 391. The tip end pin 380 fits into the hole of the retention tip end 209. The arm body 377 has the arm-side spring hooking part 381 provided on its surface on the front side in the installation direction. On the arm-side spring hooking part 381, the other end of the tape retention spring 315 of which the one end is hooked on the case-side spring hooking part 298 is hooked. The engagement inclination surface 382 is constituted by an inclination surface obtained by chamfering the corner part of the arm body 377 on the back side in the installation direction and on the side of the second tape path 257. As will be described later, the engagement inclination surface 382 engages the insertion convex part 53 provided in the cartridge installation part 7 when the ribbon cartridge 201 is installed in the cartridge installation part 7.

The arm part 309 is provided to be rotatable between a close position at which the retention tip end 209 provided at the arm part 309 comes close to the ribbon-side path lateral wall part 263 and a separate position at which the retention tip end 209 separates from the ribbon-side path lateral wall part 263. In a state in which the arm part 309 rotates to the close position, the retention tip end 209 sandwiches the second printing tape 403 that has been introduced into the second tape path 257 between the retention tip end 209 and the ribbon-side path lateral wall part 263. On the other hand, in a state in which the arm part 309 rotates to the separate position, the retention tip end 209 separates from the ribbon-side path lateral wall part 263 and does not sandwich the second printing tape 403 that has been introduced into the second tape path 257. Therefore, the retention of the second printing tape 403 is cancelled.

The tape retention spring 315 applies a force to the arm part 309 toward the close position. The tape retention spring 315 is provided at the arm supporting shaft 307. One end of the tape retention spring 315 is hooked on the arm-side spring hooking part 381, and the other end thereof is hooked on the case-side spring hooking part 298. Note that a torsion coil spring is, for example, available as the tape retention spring 315. The tape retention spring 315 is an example of an "application part."

The retention tip end 209 is provided at the tip end pin 380 of the arm part 309. The retention tip end 209 is made of a material having a high friction coefficient such as rubber, and formed into a substantially cylindrical shape. The retention tip end 209 sandwiches the second printing tape 403 that has been introduced into the second tape path 257 between the retention tip end 209 and the ribbon-side path lateral wall part 263. Thus, the tip end of the second printing tape 403 that has been introduced into the second tape path 257 is prevented from being pulled in the second tape path 257, i.e., the side of the cartridge-side tape introduction port 259 rather than being pulled in the second platen roller 203. Further, when the ribbon cartridge 201 is not installed in the tape printing device 1, for example, when the ribbon cartridge 201 is accommodated in a transportable case together with the tape roll 401, the second printing tape 403 is retained so as not to move with respect to the ribbon cartridge 201. Therefore, it is possible to prevent the occurrence of wrinkles or fold lines in the second printing tape 403. Note that the retention tip end 209 fits in the tip end pin 380 by, for example, interference fit, and thus does not rotate with respect to the tip end pin 380. Further, since the ribbon-side path lateral wall part 263 has the ribbon-part insertion holes 250 at areas corresponding to the retention tip end 209, the areas have a wall thickness larger than those of other areas of the ribbon-side path lateral wall part 263. Thus, the ribbon-side path lateral wall part 263 is allowed to properly receive a force generated when the retention tip end 209 presses the ribbon-side path lateral wall part 263 via the second printing tape 403. Note that the retention tip end 209 is an example of a "sandwiching part."

Figure 15:
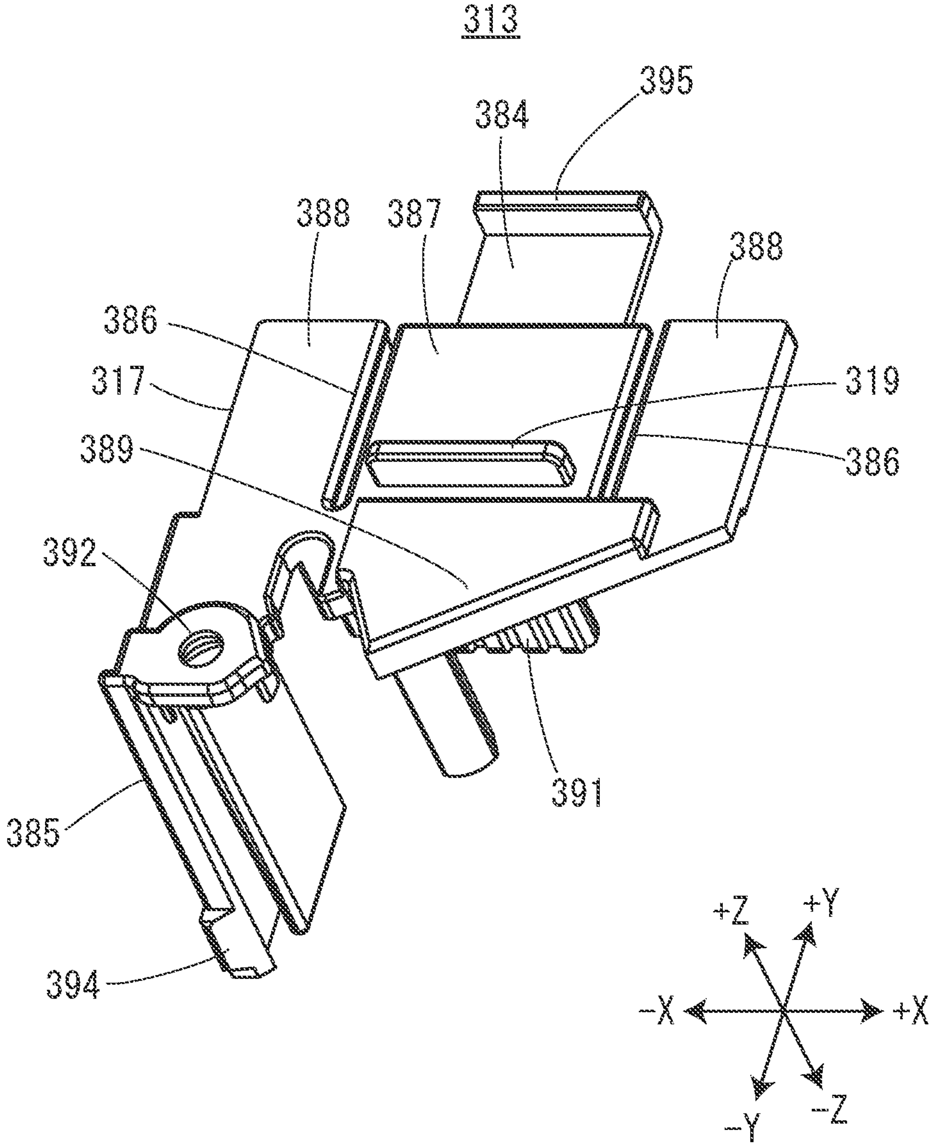
FIG. 15 is a perspective view of the slide plate.
Figure 16:
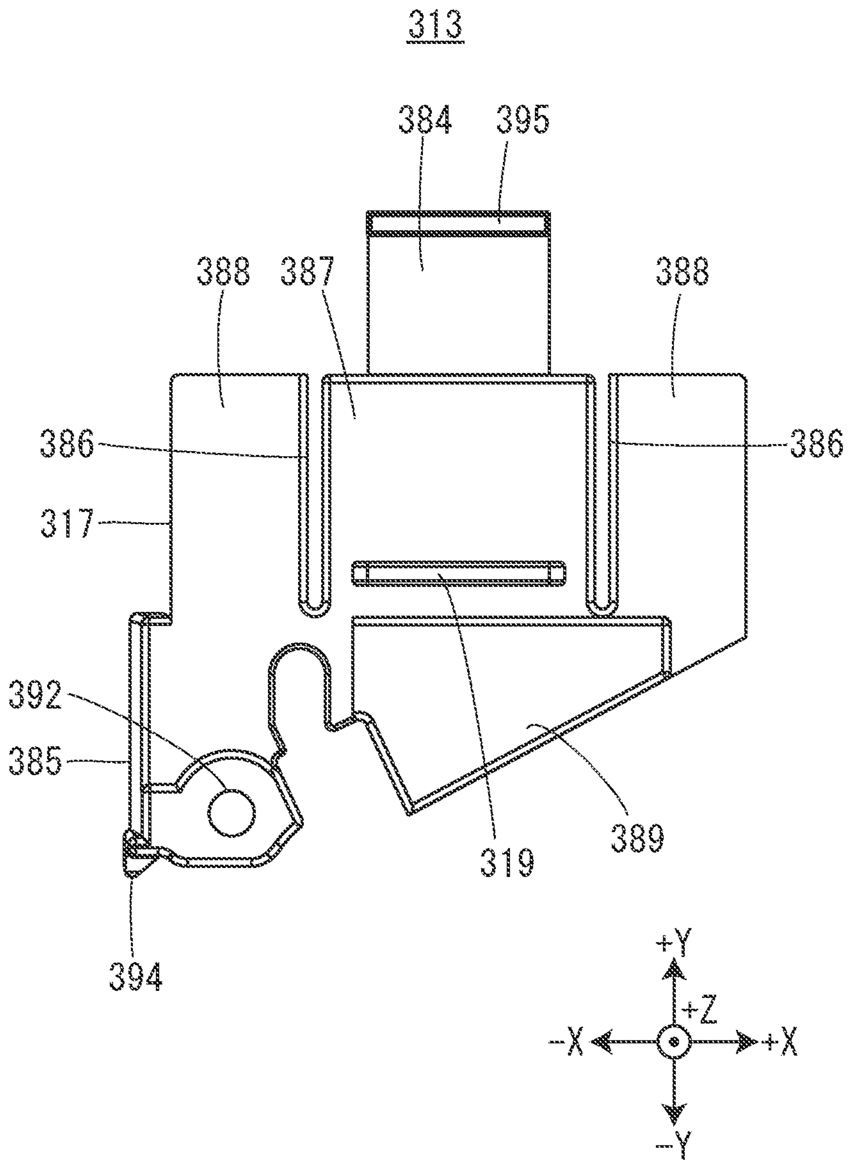
FIG. 16 is a view of the slide plate when seen from the front side in the installation direction.
Figure 17:
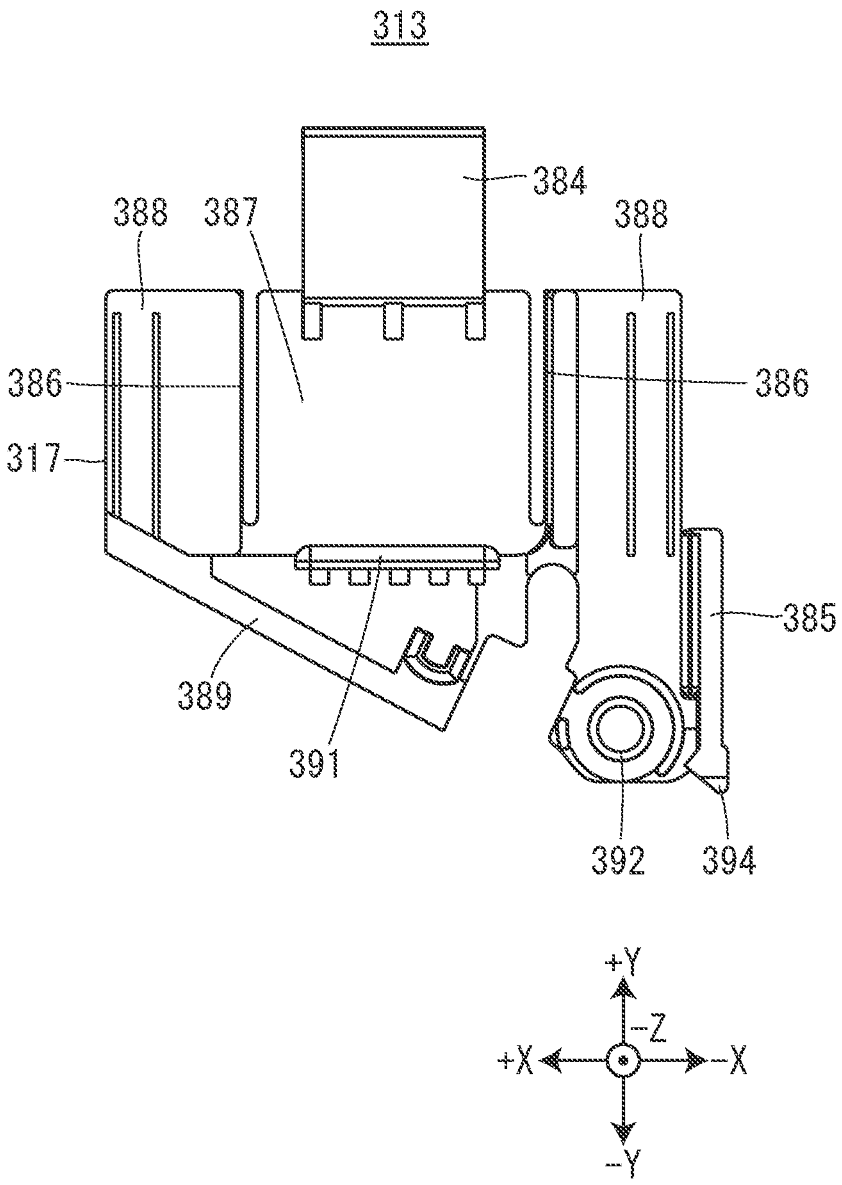
FIG. 17 is a view of the slide plate when seen from the back side in the installation direction.

As shown in FIGS. 15 to 17, the slide plate 313 is configured to be slidable in the Y direction with respect to the tape-retention-part front-side wall part 243. The slide plate 313 is a resin-molded article having translucency like the tape-retention-part front-side case 235. However, the material and manufacturing method of the slide plate 313 are not limited to those described above. Note that the slide plate 313 is an example of a "movement member."

The slide plate 313 includes a plate body 317, an extension part 384, and a slide peripheral wall part 385. The plate body 317 is, when seen from the front side in the installation direction, formed into a substantially rectangular shape of which the corner part on the +X side and the −Y side is obliquely cut off. The plate body 317 includes two slide slits 386, an inter-slit part 387, the two guide insertion parts 388, an opening opening/closing part 389, a finger hooking part 319, the arm engagement part 391, and the front-side roller engagement part 392.

The two slide slits 386 are provided to be arranged side by side in the X direction in the plate body 317. The respective slide slits 386 are provided to cut into the −Y side from the edge surface on the +Y side of the plate body 317. The inter-slit part 387 is a part between the two slide slits 386. The two guide insertion parts 388 are arranged side by side in the X direction with the inter-slit part 387 sandwiched therebetween. The guide insertion parts 388 are slidably inserted in the Y direction from the −Y side with respect to the slide guide parts 244.

An oblique edge part provided on the −Y side of the plate body 317 functions as the opening opening/closing part 389 that opens/closes the opening/closing region 260. That is, the opening opening/closing part 389 opens the opening/closing region 260 when the slide plate 313 slides to the +Y side as shown in FIG. 18, and closes the opening/closing region 260 when the slide plate 313 slides to the −Y side as shown in FIG. 5. In other words, the slide plate 313 is movable to an opening position at which the opening opening/closing part 389 opens the opening/closing region 260 and a closing position at which the opening opening/closing part 389 closes the opening/closing region 260. The slide plate 313 is generally set at the closing position, but moves to the opening position with the operation of the user when the user sets the second printing tape 403 in the second tape path 257 as will be described later.

The finger hooking part 319 is provided at the substantially center area of the surface on the front side in the installation direction of the plate body 317. The finger hooking part 319 protrudes to the front side in the installation direction, and formed into a substantially rectangular shape elongated in the X direction when seen from the front side in the installation direction. The finger hooking part 319 serves as a part that is to be pressed or pulled with a finger hooked thereon when the user moves the slide plate 313. The finger hooking part 319 is positioned on the −Y side with respect to the end surface on the −Y side of the ribbon-part front-side wall part 239. When the slide plate 313 moves to the opening position, the finger hooking part 319 is butted against the edge part on the −Y side of the ribbon-part front-side wall part 239 (see FIG. 18). Further, as will be described later, the arm part 309 rotates when the user moves the slide plate 313 with his/her finger hooked on the finger hooking part 319. That is, the finger hooking part 319 is an example of an "operation part" that rotates the arm part 309.

Figure 19:
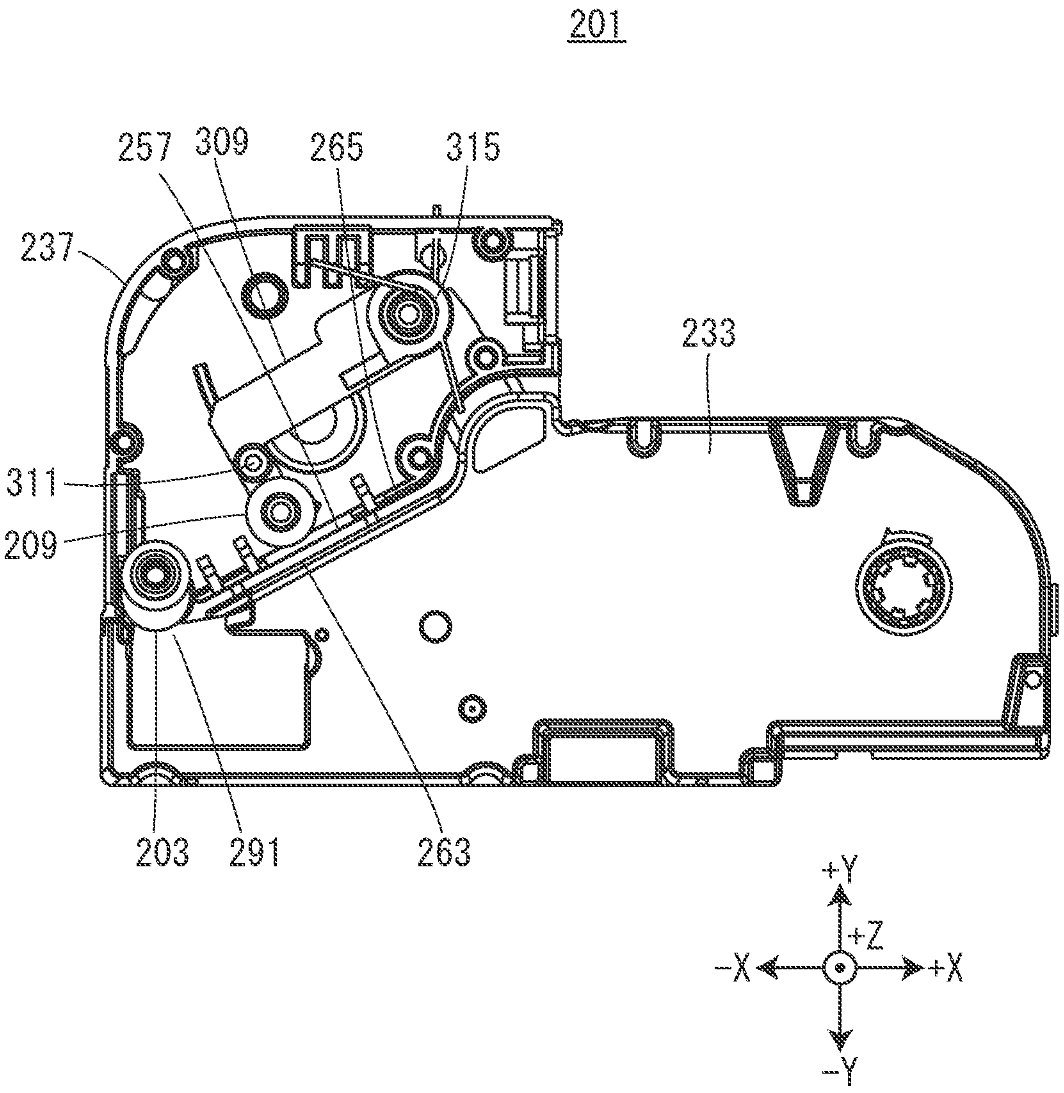
FIG. 19 is a view of the ribbon cartridge with the tape-retention-side front-side case and the slide plate removed therefrom in a state in which the slide plate is moved to the opening position when seen from the front side in the installation direction.

The arm engagement part 391 is provided on a surface on the back side in the installation direction of the plate body 317 to be positioned on the −Y side of the finger hooking part 319. The arm engagement part 391 protrudes to the back side in the installation direction, and is formed into a substantially rectangular shape elongated in the X direction when seen from the back side in the installation direction. The arm engagement part 391 is positioned on the −Y side of the engagement pin 311 provided at the arm part 309 and engages the engagement pin 311. When the slide plate 313 moves to the opening position, the arm engagement part 391 presses the engagement pin 311 to the +Y side. Therefore, as shown in FIG. 19, the arm part 309 rotates to the separate position against the tape retention spring 315. On the other hand, when the slide plate 313 moves to the closing position, the arm engagement part 391 attempts to separate from the engagement pin 311 to the −Y side. Therefore, as shown in FIG. 10, the arm part 309 rotates to the close position with the tape retention spring 315.

Figure 20:
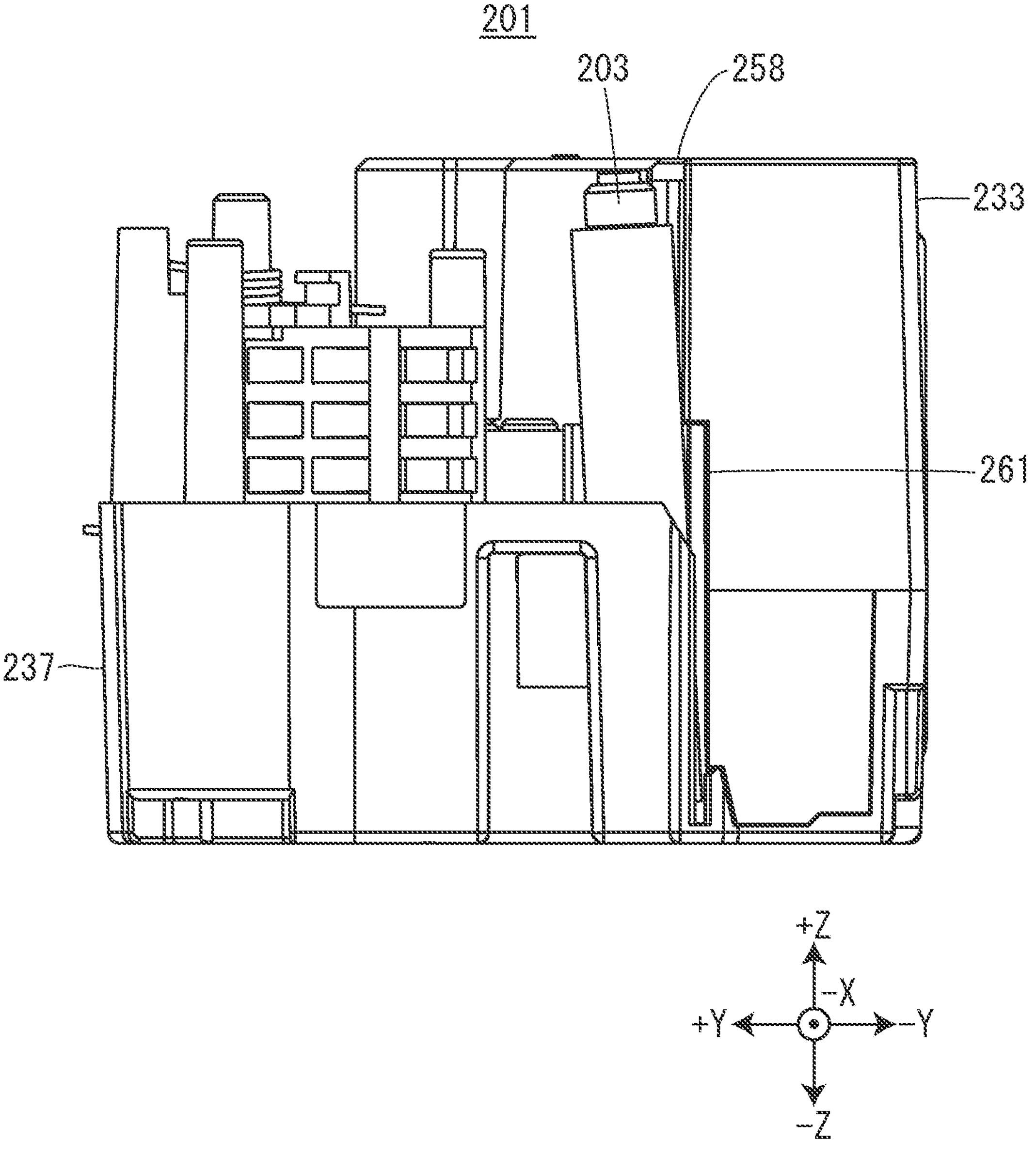
FIG. 20 is a view of the ribbon cartridge with the tape-retention-part front side case and the slide plate removed therefrom in a state in which the slide plate is moved to the opening position when seen from the side of the cartridge-side tape ejection port.
Figure 21:
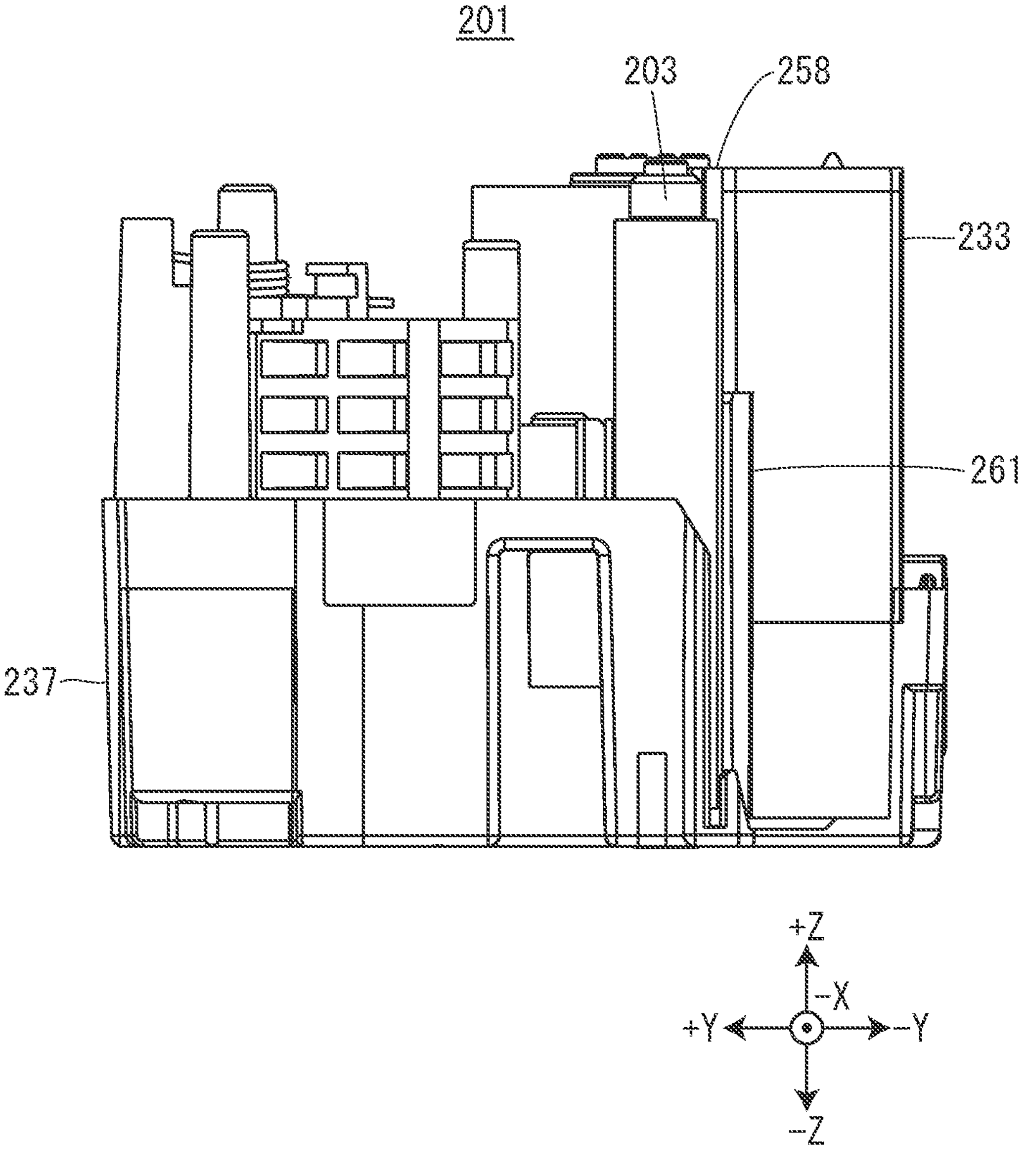
FIG. 21 is a view of the ribbon cartridge with the tape-retention-part front side case and the slide plate removed therefrom in a state in which the slide plate is moved to the closing position when seen from the side of the cartridge-side tape ejection port.

The front-side roller engagement part 392 is positioned at the corner part on the −X side and the −Y side of the plate body 317, and has a substantially circular opening. The front-side roller engagement part 392 engages the end on the front side in the installation direction, i.e., the end on the side of the set opening part 258 of the second platen roller 203. In a state in which the slide plate 313 moves to the opening position, the front-side roller engagement part 392 is positioned on the +Y side with respect to the back-side roller engagement part 248 when seen from the front side in the installation direction. Therefore, as shown in FIGS. 19 and 20, the second platen roller 203 takes an inclined posture in which the end on the side of the set opening part 258 is inclined in a direction separating from the second ribbon exposure part 291 with respect to the installation direction. On the other hand, in a state in which the slide plate 313 moves to the closing position, the front-side roller engagement part 392 is placed at the substantially same position as the back-side roller engagement part 248 when seen from the front side in the installation direction. Therefore, as shown in FIGS. 10 and 21, the second platen roller 203 takes a standing posture substantially parallel to the installation direction. Accordingly, when the slide plate 313 is at the opening position, the second platen roller 203 causes the end on the side of the set opening part 258 to further separate from the second ink ribbon 205 compared with a case in which the slide plate 313 is at the closing position.

The slide peripheral wall part 385 protrudes to the back side in the installation direction from a substantially half part on the −Y side at the edge part on the −X side of the plate body 317. The slide peripheral wall part 385 is provided between the ribbon-part front-side peripheral wall part 241 and the tape-retention-part front-side peripheral wall part 245 (see FIG. 22). The outside surface of the slide peripheral wall part 385 is substantially flush with the outside surface of the ribbon-side first peripheral wall part 215 extending in the Y direction, i.e., the movement direction of the slide plate 313. Therefore, when the slide plate 313 moves from the opening position to the closing position, the slide peripheral wall part 385 is prevented from protruding with respect to the ribbon-side first peripheral wall part 215. Thus, even if the slide plate 313 is at the opening position when the ribbon cartridge 201 is installed in the cartridge installation part 7, it is possible to prevent the slide plate 313 from coming in contact with the edge part of the cartridge installation part 7. Note that the slide peripheral wall part 385 is an example of a "movement peripheral wall part."

Figure 22:
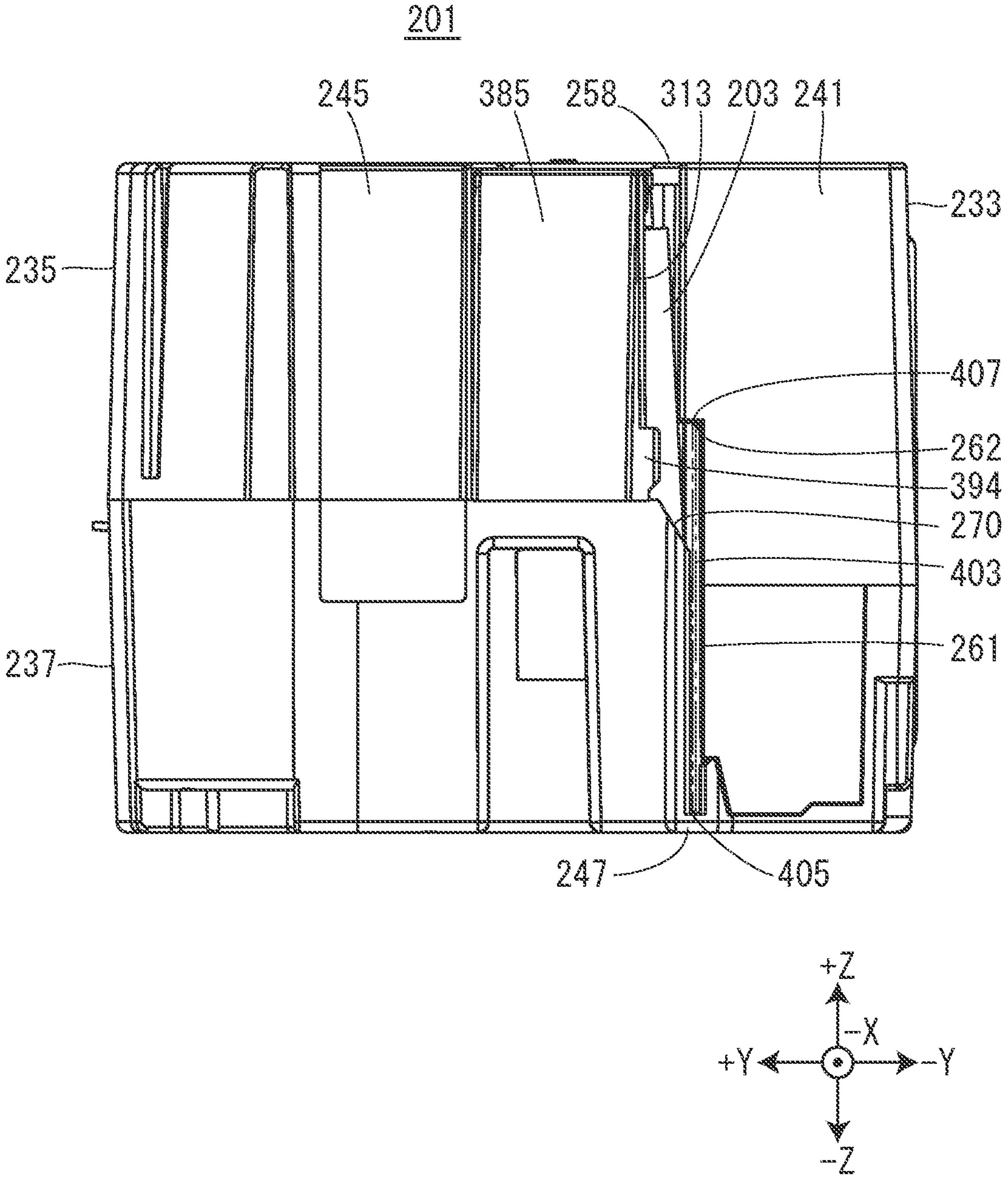
FIG. 22 is a view of the ribbon cartridge in a state in which the slide plate is moved to the opening position when seen from the side of the cartridge-side tape ejection port.

Further, the slide peripheral wall part 385 has a movable guide part 394 provided to protrude to the −Y side at the end on the back side in the installation direction of its end surface on the −Y side. When the slide plate 313 moves to the closing position, the movable guide part 394 comes close to the second printing tape 403 that has been introduced into the second tape path 257 from the +Y side and moves to a guide position at which the second printing tape 403 is guided to the Y direction, i.e., the front-surface and rear-surface direction of the second printing tape 403 between the movable guide part 394 and the edge part on the −Y side of the cartridge-side tape ejection port 261 as shown in FIG. 12. On the other hand, when the slide plate 313 moves to the opening position, the movable guide part 394 moves to a non-guide position separated from the second printing tape 403 to the +Y side as shown in FIG. 22. That is, the movable guide part 394 is movable between the guide position and the non-guide position with the movement of the slide plate 313.

The extension part 384 extends to the +Y side from the inter-slit part 387, and formed into a substantially rectangular shape when seen from the front side in the installation direction. The extension part 384 has, at its end on the +Y side, the plate-side engagement part 395 provided to protrude to the front side in the installation direction. When the slide plate 313 moves to the opening position, the plate-side engagement part 395 gets over the case-side engagement part 254 toward the +Y side as the inter-slit part 387 and the extension part 384 bend to the back side in the installation direction. As a result, the plate-side engagement part 395 engages the case-side engagement part 254. A force is applied to the slide plate 313 in a direction in which the slide plate 313 is caused to move to the closing position by the tape retention spring 315 via the arm part 309. However, since the plate-side engagement part 395 engages the case-side engagement part 254, the slide plate 313 is maintained at the opening position against the tape retention spring 315 even if the user releases his/her finger from the finger hooking part 319. Thus, the arm part 309 is maintained at the separate position, the inclined posture of the second platen roller 203 is maintained, and the movable guide part 394 is maintained at a non-guide position. On the other hand, when the slide plate 313 moves to the closing position, the plate-side engagement part 395 gets over the case-side engagement part 254 toward the −Y side as the inter-slit part 387 and the extension part 384 bend to the back side in the installation direction. As a result, the plate-side engagement part 395 disengages from the case-side engagement part 254. Note that the plate-side engagement part 395 is an example of a "movement-side engagement part."

In the tape retention part 305 thus configured, the arm part 309 rotates to the separate position, the second platen roller 203 takes an inclined posture, and the movable guide part 394 moves to the non-guide position as described above when the user moves the slide plate 313 to the opening position with his/her finger hooked on the finger hooking part 319.

Since a gap is formed between the retention tip end 209 and the ribbon-side path lateral wall part 263 as the arm part 309 rotates to the separate position, the user is allowed to easily set the second printing tape 403 between the retention tip end 209 and the ribbon-side path lateral wall part 263. Further, since the second platen roller 203 takes an inclined posture, the gap between the second platen roller 203 and the second ink ribbon 205 widens on the front side in the installation direction, i.e., the side of the set opening part 258 of the second platen roller 203. Thus, the user is allowed to easily set the second printing tape 403 between the second ink ribbon 205 and the second platen roller 203. Further, since the movable guide part 394 moves to the non-guide position, it is possible to prevent the movable guide part 394 from obstructing the second printing tape 403 when the user sets the second printing tape 403 in the second tape path 257 from the set opening part 258.

On the other hand, when the user moves the slide plate 313 to the closing position with his/her finger hooked on the finger hooking part 319, the arm part 309 rotates to the close position, the second platen roller 203 takes a standing posture, and the movable guide part 394 moves to the guide position as described above.

As the arm part 309 rotates to the close position, the second printing tape 403 that has been introduced into the second tape path 257 is sandwiched between the retention tip end 209 and the ribbon-side path lateral wall part 263. In this state, when a force is applied to the second printing tape 403 in a direction in which the tip end of the second printing tape 403 is pulled in the second tape path 257, a component F of the frictional force between the retention tip end 209 and the second printing tape 403 acts in a direction in which the arm part 309 rotates from the close position to a side opposite to the separate position, i.e., a counterclockwise direction in FIG. 10. Therefore, when a force is applied to the second printing tape 403 in a direction in which the tip end of the second printing tape 403 is pulled in the second tape path 257, the second printing tape 403 is more firmly sandwiched between the retention tip end 209 and the ribbon-side path lateral wall part 263. Therefore, it is possible to more effectively prevent the tip end of the second printing tape 403 from being pulled in the second tape path 257. Further, since the second platen roller 203 takes a standing posture, the platen shaft 39 is properly inserted into the second platen roller 203 when the ribbon cartridge 201 is installed in the cartridge installation part 7. Further, since the movable guide part 394 moves to the guide position, the second printing tape 403 is guided by the movable guide part 394 in the width direction of the second printing tape 403 when the second printing tape 403 is fed in the second tape path 257.

As described above, the second printing tape 403 that has been introduced into the second tape path 257 is sandwiched between the retention tip end 209 and the ribbon-side path lateral wall part 263 by the retention tip end 209. Therefore, the tip end of the second printing tape 403 is prevented from being pulled in the cartridge-side tape introduction port 259 rather than being pulled in the second platen roller 203. Of course, in a case in which the user falsely strongly pulls the second printing tape 403, the tip end of the second printing tape 403 is pulled in the cartridge-side tape introduction port 259 rather than being pulled in the second platen roller 203. If the tip end of the second printing tape 403 is pulled in the cartridge-side tape introduction port 259 rather than being pulled in the second platen roller 203, it becomes impossible to feed the second printing tape 403 by means of the second platen roller 203.

In order to solve this problem, the user is allowed to reset the second printing tape 403 in the second tape path 257 by performing the following operations with respect to the ribbon cartridge 201. First, the user moves the slide plate 313 to the opening position with his/her finger hooked on the finger hooking part 319 to open the opening/closing region 260, and removes the second printing tape 403 from the second tape path 257. Subsequently, the user resets the second printing tape 403 in the second tape path 257 from the set opening part 258 with the tip end of the second printing tape 403 projecting to the outside of the second tape path 257 from the cartridge-side tape ejection port 261. Therefore, the user is not required to perform a complicated operation, i.e., feeding the second printing tape 403 from the side of the cartridge-side tape introduction port 259 with the tip end of the second printing tape 403 projecting to the outside of the second tape path 257 from the cartridge-side tape ejection port 261. Finally, the user moves the slide plate 313 to the closing position with the finger hooked on the finger hooking part 319 to close the opening/closing region 260. Thus, it is possible to prevent foreign matter from entering the second tape path 257 from the opening/closing region 260.

Note that the ribbon cartridge 201 is put on the market together with the tape roll 401 with the second printing tape 403 set in the second tape path 257 in advance. However, the ribbon cartridge 201 may be put on the market together with the tape roll 401 with the second printing tape 403 not set in the second tape path 257 in advance, or may be put on the market separately from the tape roll 401. In these cases, the user is only required to set the second printing tape 403 in the second tape path 257 in the same procedure as the above before installing the ribbon cartridge 201 in the cartridge installation part 7.

Further, the user is allowed to set the second printing tape 403 and the ribbon cartridge 201 in the tape printing device 1 at the same time by performing an easy operation, i.e., installing the ribbon cartridge 201 with the second printing tape 403 that has been introduced into the second tape path 257 in advance in the cartridge installation part 7. That is, the user is not required to separately perform the operation of installing the ribbon cartridge 201 in the cartridge installation part 7 and the operation of introducing the second printing tape 403 into the cartridge installation part 7.

Figure 23:
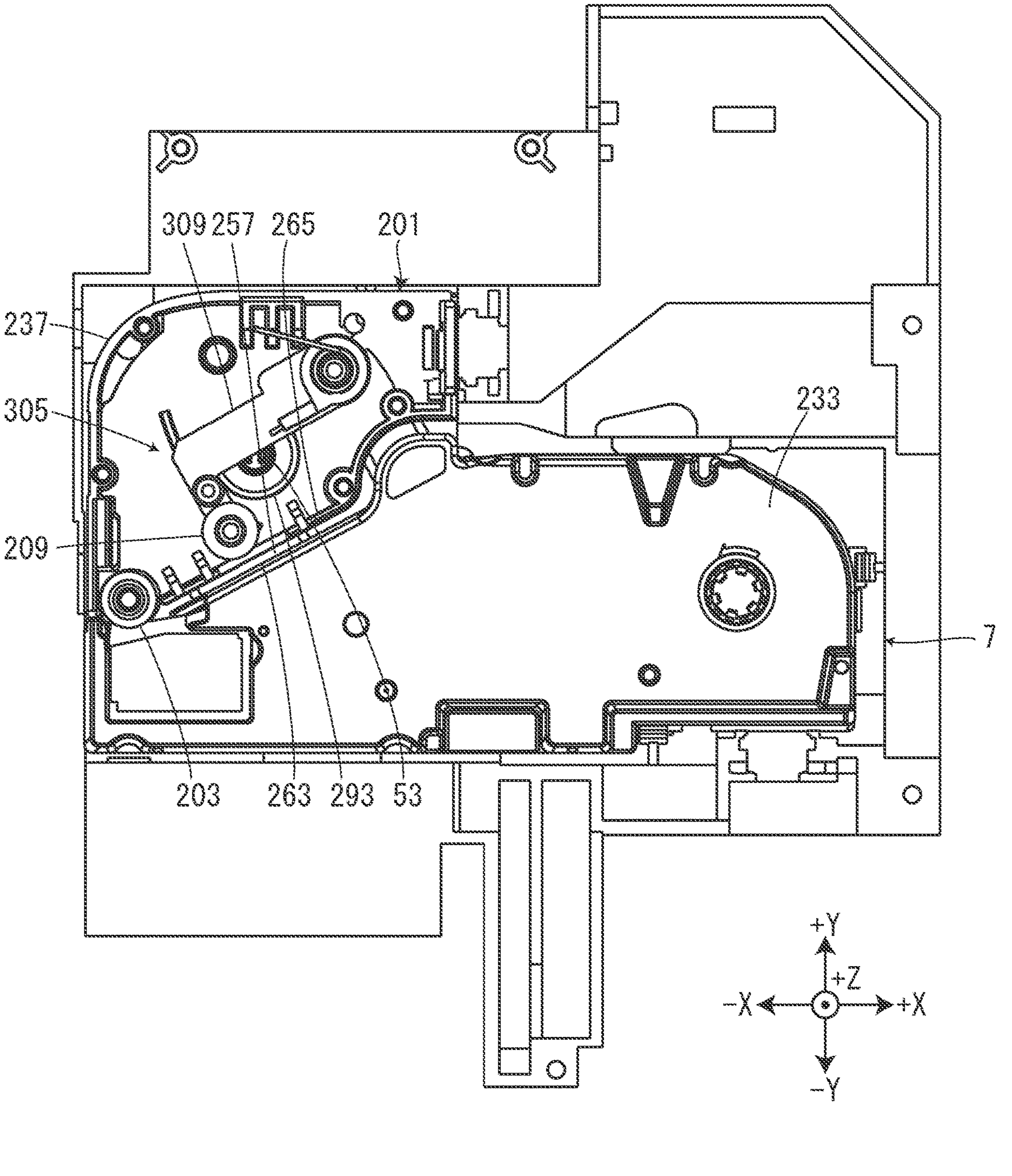
FIG. 23 is a view of the ribbon cartridge installed in the cartridge installation part with the tape-retention-part front side case and the slide plate removed therefrom when seen from the front side in the installation direction.

Further, when the ribbon cartridge 201 is installed in the cartridge installation part 7, the insertion convex part 53 that has been inserted into the second cylindrical shaft part 293 engages the engagement inclination surface 382 of the arm part 309. Thus, as shown in FIG. 23, the arm part 309 rotates from the close position to the separate position. At this time, the retention tip end 209 does not sandwich the second printing tape 403 between the retention tip end 209 and the ribbon-side path lateral wall part 263. Therefore, the retention of the second printing tape 403 is cancelled. Accordingly, in a state in which the ribbon cartridge 201 is installed in the cartridge installation part 7, the second printing tape 403 is smoothly fed in the second tape path 257. The insertion convex part 53 is an example of a "retention cancellation convex part." Note that the separate position of the arm part 309 when the arm part 309 rotates as the insertion convex part 53 engages the engagement inclination surface 382 of the arm part 309 and the separate position of the arm part 309 when the arm part 309 rotates as the slide plate 313 moves to the opening position may be the same or different from each other.

Note that in a state in which the ribbon cartridge 201 is installed in the cartridge installation part 7, the platen shaft 39 is inserted into the second platen roller 203 as described above. In a state in which the platen shaft 39 is inserted into the second platen roller 203, the movement of the slide plate 313 is restricted. Thus, in a state in which the ribbon cartridge 201 is installed in the cartridge installation part 7, the user is prevented from falsely moving the slide plate 313 from the closing position to the opening position.

Further, the second printing tape 403 is, when introduced into the second tape path 257, guided by the second back wall part 247, the introduction-side guide part 264, and ejection-side guide part 262 in the width direction. Accordingly, the second printing tape 403 is not greatly shifted in the width direction inside the second tape path 257 even if the ribbon cartridge 201 does not include the tape retention part 305. In other words, the ribbon cartridge 201 may not include the tape retention part 305. In this case as well, the user is allowed to set the second printing tape 403 and the ribbon cartridge 201 in the tape printing device 1 at the same time.

[Tape Cartridge]

Figure 24:
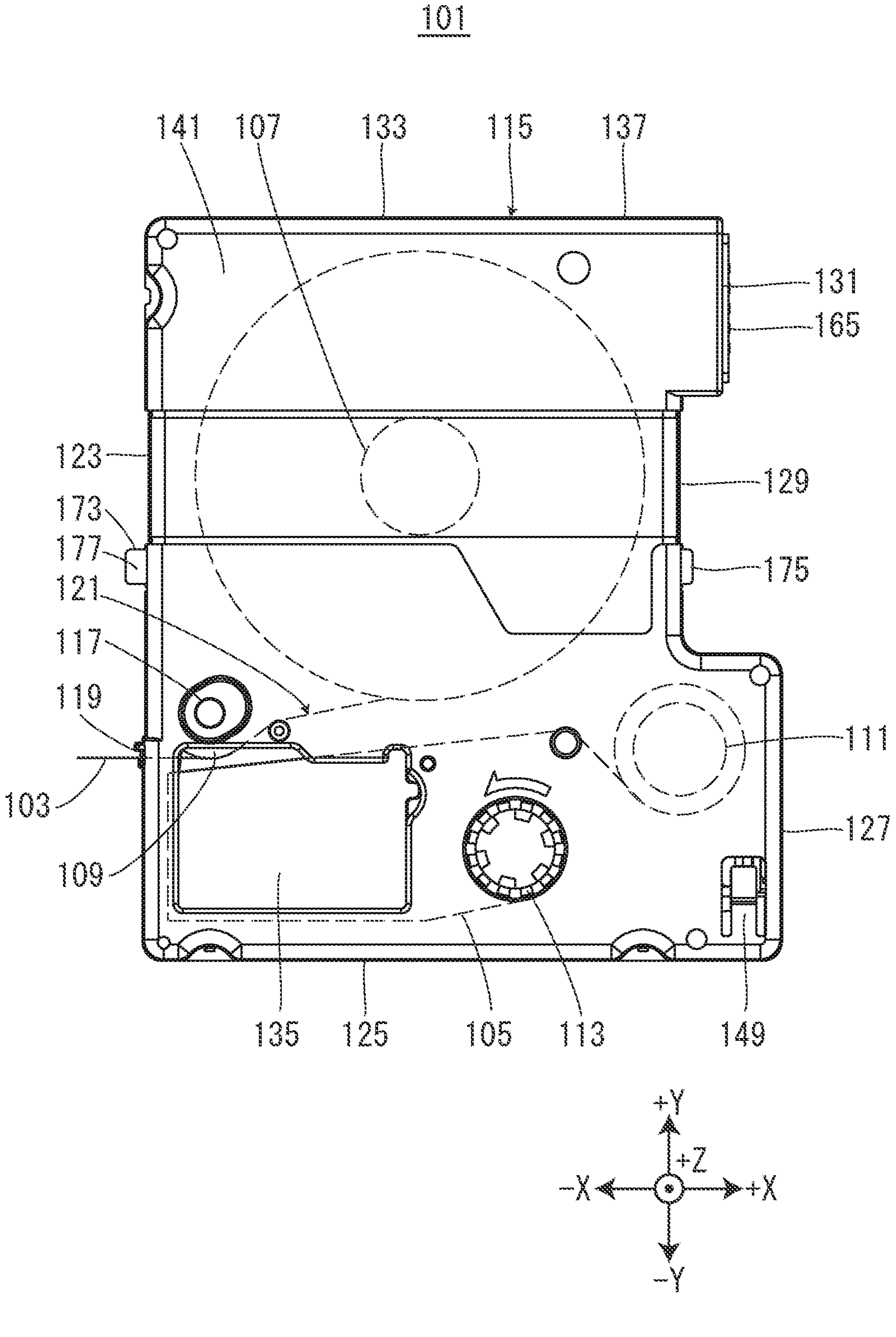
FIG. 24 is a view of the tape cartridge when seen from the front side in the installation direction.
Figure 25:
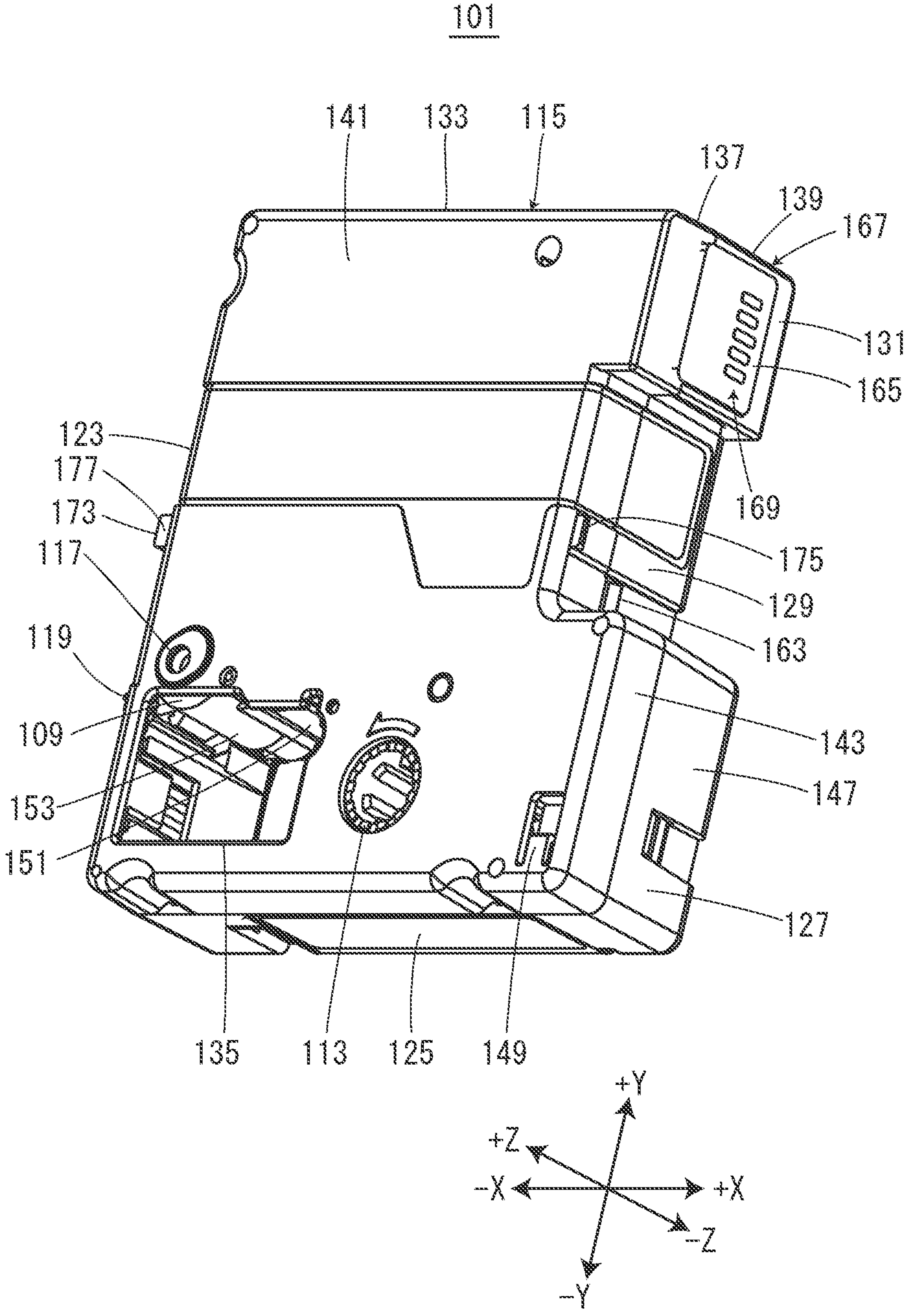
FIG. 25 is a perspective view of the tape cartridge.
Figure 26:
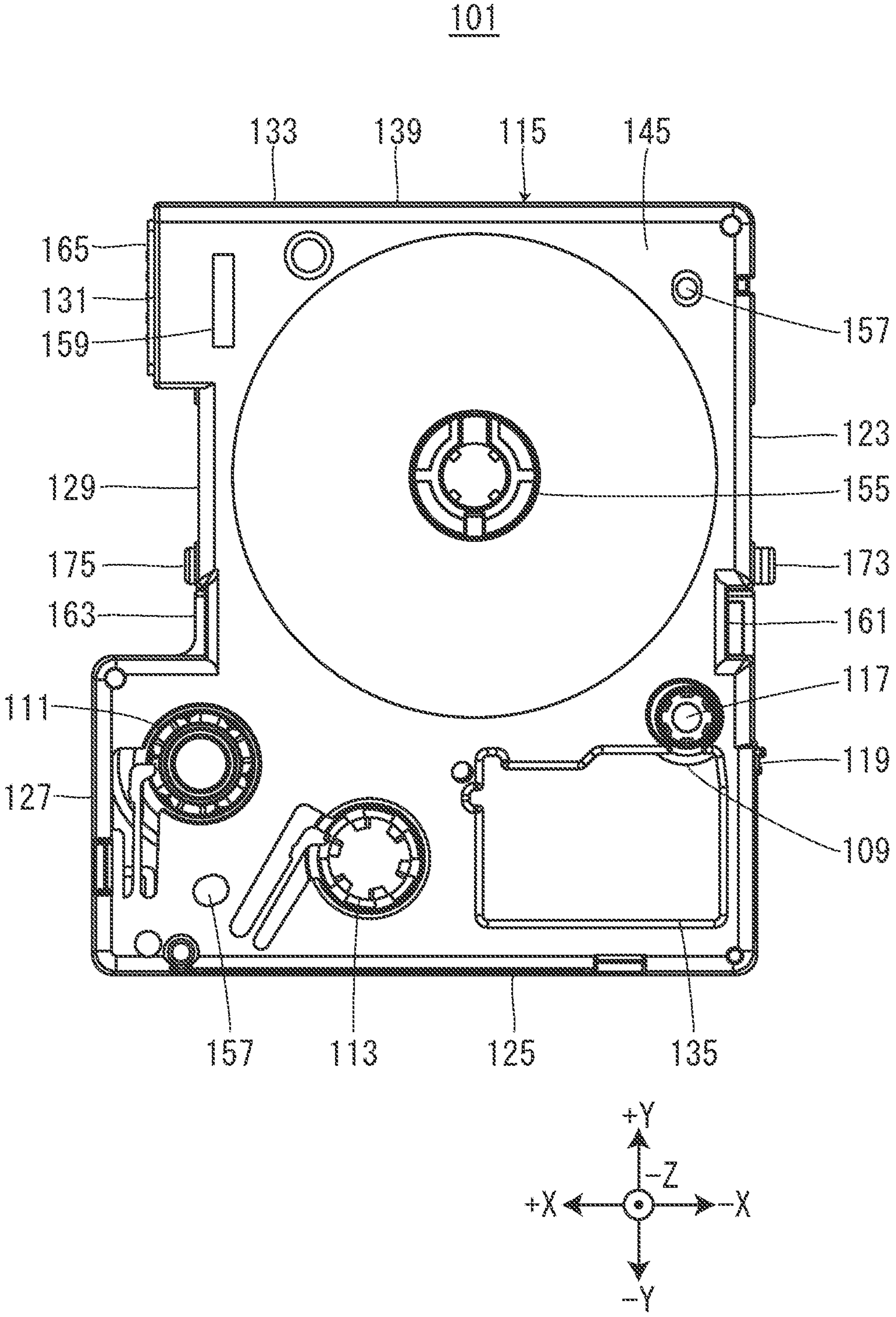
FIG. 26 is a view of the tape cartridge when seen from the back side in the installation direction.

The tape cartridge 101 will be described on the basis of FIGS. 24 to 26. The tape cartridge 101 includes a tape core 107, a first platen roller 109, a first paying-out core 111, a first winding core 113, and a first cartridge case 115 that rotatably accommodates the tape core 107, the first platen roller 109, the first paying-out core 111, and the first winding core 113. The tape core 107, the first platen roller 109, the first paying-out core 111, and the first winding core 113 are, when seen from the front side in the installation direction, provided at positions corresponding to the insertion convex part 53, the platen shaft 39, the first paying-out shaft 41, and the first winding shaft 43, provided in the cartridge installation part 7, respectively. The first platen roller 109 has a first platen shaft insertion hole 117 penetrating in the installation direction.

The first printing tape 103 is wound on the tape core 107. The first printing tape 103 that has been paid out from the tape core 107 is delivered to the outside of the first cartridge case 115 from a tape delivery port 119 provided on a tape-side first peripheral wall part 123 that will be described later. In the first cartridge case 115, a first tape path 121 ranging from the tape core 107 to the tape delivery port 119 is provided. The first ink ribbon 105 is wound on the first paying-out core 111. The first ink ribbon 105 that has been paid out from the first paying-out core 111 is wound up by the first winding core 113. Note that the first cartridge case 115 includes a plurality of types having different thicknesses, i.e., different dimensions in the installation direction depending on the widths of the accommodated first printing tape 103 and the first ink ribbon 105.

The first cartridge case 115 is, when seen from the front side in the installation direction, formed into a shape obtained by bending both ends of the long sides of a rectangle in the same direction and at a right angle. Here, in the peripheral wall part of the first cartridge case 115, a peripheral wall part on the −X side is defined as the tape-side first peripheral wall part 123. A peripheral wall part extending to the +X side from the end on the −Y side of the tape-side first peripheral wall part 123 is defined as a tape-side second peripheral wall part 125. Peripheral wall parts extending to the +Y side from the end on the +X side of the tape-side second peripheral wall part 125 are defined as a tape-side third peripheral wall part 127, a tape-side fourth peripheral wall part 129, and a tape-side fifth peripheral wall part 131 in an order from the −Y side. The tape-side fourth peripheral wall part 129 is formed into a concave shape with respect to the tape-side third peripheral wall part 127 and the tape-side fifth peripheral wall part 131. A peripheral wall part extending to the −X side from the end on the +Y side of the tape-side fifth peripheral wall part 131 is defined as a tape-side sixth peripheral wall part 133. The end on the −X side of the tape-side sixth peripheral wall part 133 is connected to the end on the +Y side of the tape-side first peripheral wall part 123.

The first cartridge case 115 has a first head insertion hole 135 provided to penetrate in the installation direction. The first head insertion hole 135 is, when seen from the front side in the installation direction, positioned at a corner part at which the tape-side first peripheral wall part 123 and the tape-side second peripheral wall part 125 cross each other. The first head insertion hole 135 is, when seen from the front side in the installation direction, formed into a shape corresponding to the head cover 56, i.e., a substantially rectangular shape. When the tape cartridge 101 is attached to and detached from the cartridge installation part 7, the first head insertion hole 135 and the first platen shaft insertion hole 117 position the tape cartridge 101 and guide the attachment and detachment of the tape cartridge 101.

The first cartridge case 115 includes a first front-side case 137 and a first back-side case 139. When the tape cartridge 101 is installed in the cartridge installation part 7, the first front-side case 137 and the first back-side case 139 are arranged on the front side and the back side in the installation direction, respectively. The first front-side case 137 is a resin-molded article having translucency, and the first back-side case 139 is a resin-molded article having no translucency. However, the materials and manufacturing methods of the first front-side case 137 and the first back-side case 139 are not limited to those described above.

The first front-side case 137 includes a first front-side wall part 141 and a first front-side peripheral wall part 143 protruding to the back side in the installation direction from the peripheral edge part of the first front-side wall part 141. The first back-side case 139 includes a first back wall part 145 and a first back-side peripheral wall part 147 protruding to the front side in the installation direction from the peripheral edge part of the first back wall part 145. The first front-side case 137 and the first back-side case 139 are combined together with the first front-side peripheral wall part 143 and the first back-side peripheral wall part 147 butted against each other.

The first front-side wall part 141 has an elastic part 149 at its corner part at which the tape-side second peripheral wall part 125 and the tape-side third peripheral wall part 127 cross each other. The elastic part 149 is, when seen from the front side in the installation direction, formed as a substantially rectangular part obtained by cutting off a part of the first front-side wall part 141 into a "U"-shape. When the installation-part cover 5 is closed in a state in which the tape cartridge 101 is installed in the cartridge installation part 7, the second pressing protrusion 20 provided on the installation-part cover 5 is butted against the elastic part 149 to cause the displacement of the elastic part 149 to the back side in the installation direction. A pressing force accompanied by the elastic displacement of the elastic part 149 is received by the second pressing protrusion 20. As a result, the tape cartridge 101 is pressed to the back side in the installation direction. Thus, the tape cartridge 101 is prevented from being installed in a state of floating from the installation bottom surface 37.

The first back wall part 145 has a first head peripheral edge convex part 151 provided to protrude to the front side in the installation direction from the peripheral edge part of the first head insertion hole 135. The first head peripheral edge convex part 151 has, on its +Y side, i.e., the side of the first platen roller 109, a first ribbon exposure part 153 at which the first ink ribbon 105 is exposed. In FIG. 25 showing the first ribbon exposure part 153, the first ink ribbon 105 is omitted. In a state in which the tape cartridge 101 is installed in the cartridge installation part 7, the printing head 55 that has been inserted into the first head insertion hole 135 faces the first platen roller 109 with the first ink ribbon 105 and the first printing tape 103 sandwiched between the printing head 55 and the first platen roller 109.

The first back wall part 145 has a first cylindrical shaft part 155 provided to protrude to the front side in the installation direction. The first cylindrical shaft part 155 is formed into a substantially-stepped cylindrical shape, and rotatably supports the tape core 107. In a state in which the tape cartridge 101 is installed in the cartridge installation part 7, the insertion convex part 53 provided in the cartridge installation part 7 is inserted into the first cylindrical shaft part 155 provided in the tape cartridge 101.

Further, the first back wall part 145 has, on its surface on the back side in the installation direction, a plurality of first positioning holes 157 provided to be on a diagonal line. In a state in which the tape cartridge 101 is installed in the cartridge installation part 7, the first positioning holes 157 provided on the tape cartridge 101 engage the positioning pins 65 provided in the cartridge installation part 7. Thus, the tape cartridge 101 is positioned with respect to the cartridge installation part 7.

In addition, the first back wall part 145 has a first convex-part reception part 159 at a position at which the tape-side fifth peripheral wall part 131 and the tape-side sixth peripheral wall part 133 cross each other. In a state in which the tape cartridge 101 is installed in the cartridge installation part 7, the first convex-part reception part 159 provided in the tape cartridge 101 receives the engagement convex part 51 provided in the cartridge installation part 7.

In the first back-side peripheral wall part 147, the tape-side first peripheral wall part 123 has a tape-side first hook engagement part 161, and the tape-side fourth peripheral wall part 129 has a tape-side second hook engagement part 163. In a state in which the tape cartridge 101 is installed in the cartridge installation part 7, the tape-side first hook engagement part 161 and the tape-side second hook engagement part 163 provided in the tape cartridge 101 engage the first hook 57 and the second hook 59 provided in the cartridge installation part 7, respectively. Thus, the tape cartridge 101 is prevented from being installed in a state of floating from the installation bottom surface 37. Further, in the first back-side peripheral wall part 147, the tape-side fifth peripheral wall part 131 has a first circuit substrate 165. That is, the first circuit substrate 165 is attached to the tape-side fifth peripheral wall part 131 provided to be substantially parallel to the tape-side first peripheral wall part 123 on which the tape delivery port 119 is provided. The tape-side fifth peripheral wall part 131 has a first substrate attachment part 167 to which the first circuit substrate 165 is attached.

A first gripping part 173 protrudes to the −X side from the tape-side first peripheral wall part 123, and a second gripping part 175 protrudes from the tape-side fourth peripheral wall part 129. The first gripping part 173 and the second gripping part 175 are, when seen from the front side in the installation direction, provided at a substantially intermediate part in the Y direction in the whole first cartridge case 115. The first gripping part 173 and the second gripping part 175 serve as hooking parts used when the user grips the tape cartridge 101. Here, the surface on the front side in the installation direction of the first gripping part 173 is defined as a sixth pressing part 177. When the installation-part cover 5 is closed in a state in which the ribbon cartridge 201 is installed in the cartridge installation part 7, the sixth pressing protrusion 24 (see FIG. 2) provided on the installation-part cover 5 is butted against the sixth pressing part 177. Thus, the sixth pressing part 177 is pressed to the back side in the installation direction by the sixth pressing protrusion 24.

[Printing Processing Performed when Tape Cartridge is Installed]

Figure 27:
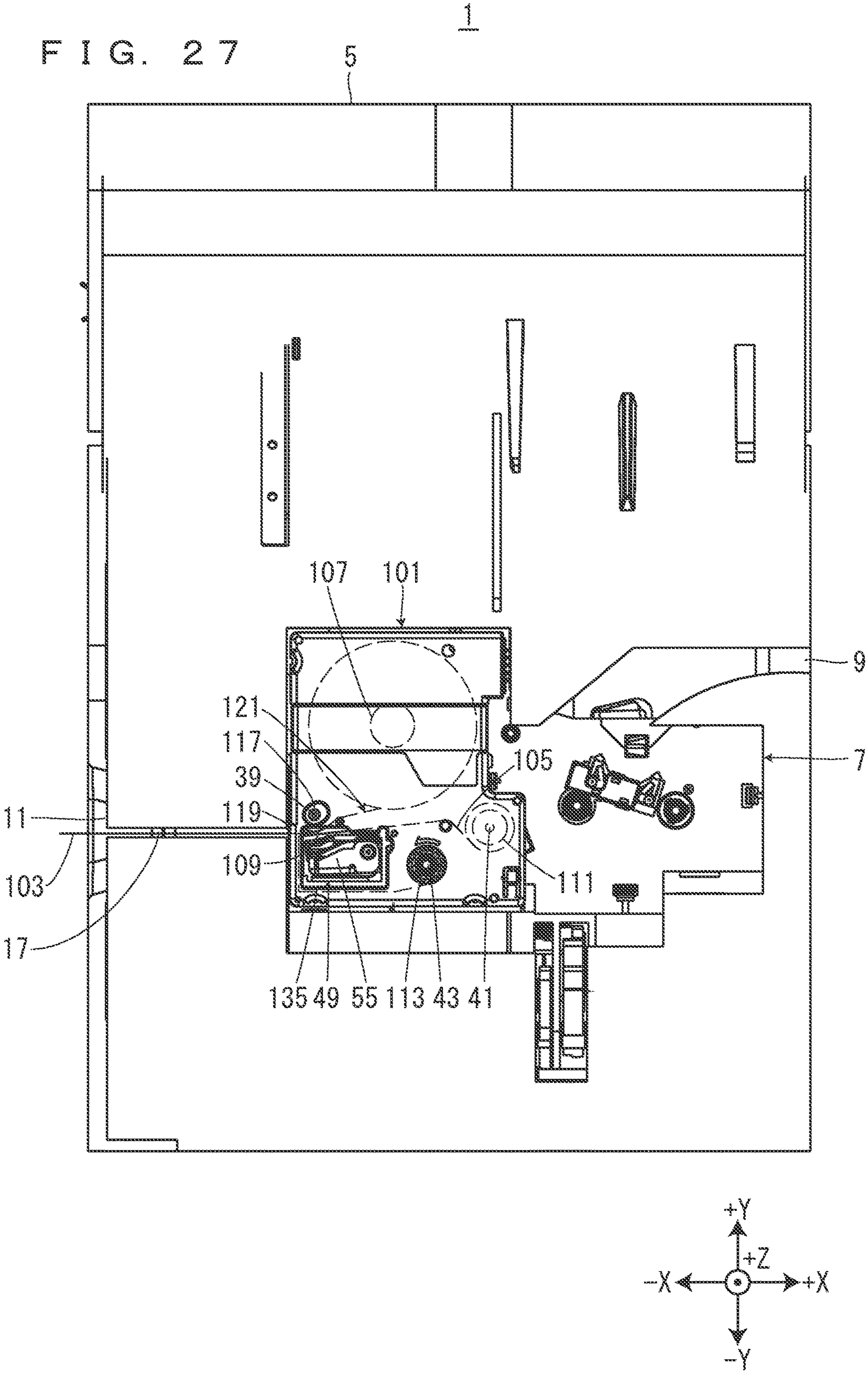
FIG. 27 is a view for describing printing processing performed by the tape printing device in a state in which the tape cartridge is installed in the cartridge installation part.

Printing processing performed by the tape printing device 1 in a state in which the tape cartridge 101 is installed in the cartridge installation part 7 will be described on the basis of FIG. 27. In a state in which the tape cartridge 101 is installed in the cartridge installation part 7, the platen shaft 39, the first paying-out shaft 41, and the first winding shaft 43 provided in the cartridge installation part 7 are inserted into the first platen shaft insertion hole 117 of the first platen roller 109, the first paying-out core 111, and the first winding core 113 provided in the tape cartridge 101, respectively. Thus, the driving force of the feeding motor (not shown in the figure) provided in the tape printing device 1 becomes transmissible to the first platen roller 109, the first paying-out core 111, and the first winding core 113.

Further, in a state in which the tape cartridge 101 is installed in the cartridge installation part 7, the head part 49 provided in the cartridge installation part 7 is inserted into the first head insertion hole 135 provided on the tape cartridge 101. When the installation-part cover 5 is closed after the installation of the tape cartridge 101 in the cartridge installation part 7, the printing head 55 is caused to move to the platen shaft 39 by the head movement mechanism (not shown in the figure). Thus, the first printing tape 103 and the first ink ribbon 105 are sandwiched between the printing head 55 and the first platen roller 109.

When the feeding motor rotates in a normal direction in this state, the first platen roller 109 rotates in the normal direction and the first winding core 113 rotates in a winding direction. Thus, the first printing tape 103 that has been paid out from the tape core 107 is fed to the device-side tape ejection port 11 via the tape delivery port 119, and the first ink ribbon 105 that has been paid out from the first paying-out core 111 is wound up by the first winding core 113.

Further, when the feeding motor rotates in a reverse direction opposite to the normal direction, the first platen roller 109 rotates in the reverse direction opposite to the normal direction and the first paying-out core 111 rotates in a rewinding direction. Thus, the first printing tape 103 that has been ejected from the tape delivery port 119 is returned to the inside of the first cartridge case 115, and the first ink ribbon 105 that has been paid out from the first paying-out core 111 is rewound on the first paying-out core 111. As described above, the first paying-out shaft 41 inserted into the first paying-out core 111 and the first winding shaft 43 inserted into the first winding core 113 constitute a first ink ribbon transportation mechanism that feeds the first ink ribbon 105.

By rotating the feeding motor in the normal direction and heating the printing head 55, the tape printing device 1 prints printing information input via the keyboard or the like on the first printing tape 103 while feeding the first printing tape 103 and the first ink ribbon 105. After the completion of the printing, the tape printing device 1 causes the cutter 17 to perform a cutting operation to cut off a printed portion of the first printing tape 103. Then, by rotating the feeding motor in the reverse direction, the tape printing device 1 returns the first printing tape 103 until the tip end of the first printing tape 103 comes to the vicinity of a position at which the tip end is sandwiched between the printing head 55 and the first platen roller 109, i.e., the vicinity of a printing position. Thus, it is possible to reduce a margin to be created on the front side in the length direction of the first printing tape 103 that is to be next printed since the printing head 55 and the cutter 17 are separated from each other.

MODIFIED EXAMPLES

Besides the above embodiments, various configurations are adoptable without departing from the spirit as a matter of course. For example, the above embodiments are capable of being modified into the following modes.

The tape cartridge 101 may be configured not to include the first circuit substrate 165. Similarly, the ribbon cartridge 201 may be configured not to include the second circuit substrate 327.

Figure 28:
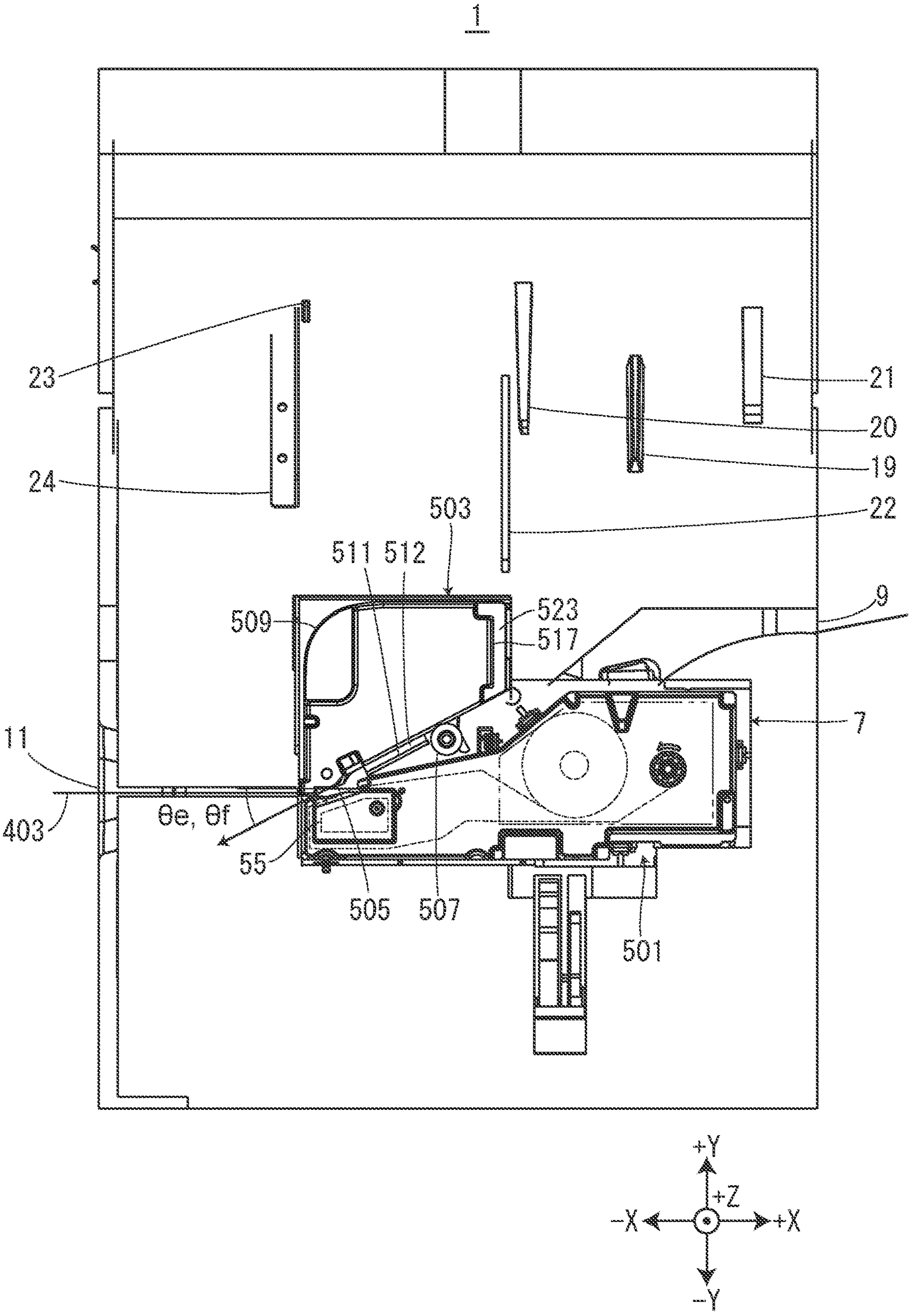
FIG. 28 is a view of the tape printing device with an ink ribbon accommodation cartridge and a tape guide cartridge installed therein when seen from the front side in the installation direction.

Further, as shown in FIG. 28, an ink ribbon accommodation cartridge 501 and a tape guide cartridge 503 may be configured to be installed in the cartridge installation part 7 instead of the ribbon cartridge 201. The ink ribbon accommodation cartridge 501 is configured to be substantially the same as the ink ribbon accommodation part 253 of the ribbon cartridge 201, and the tape guide cartridge 503 is configured to be substantially the same as the tape-retention-mechanism accommodation part 255 of the ribbon cartridge 201.

Figure 29:
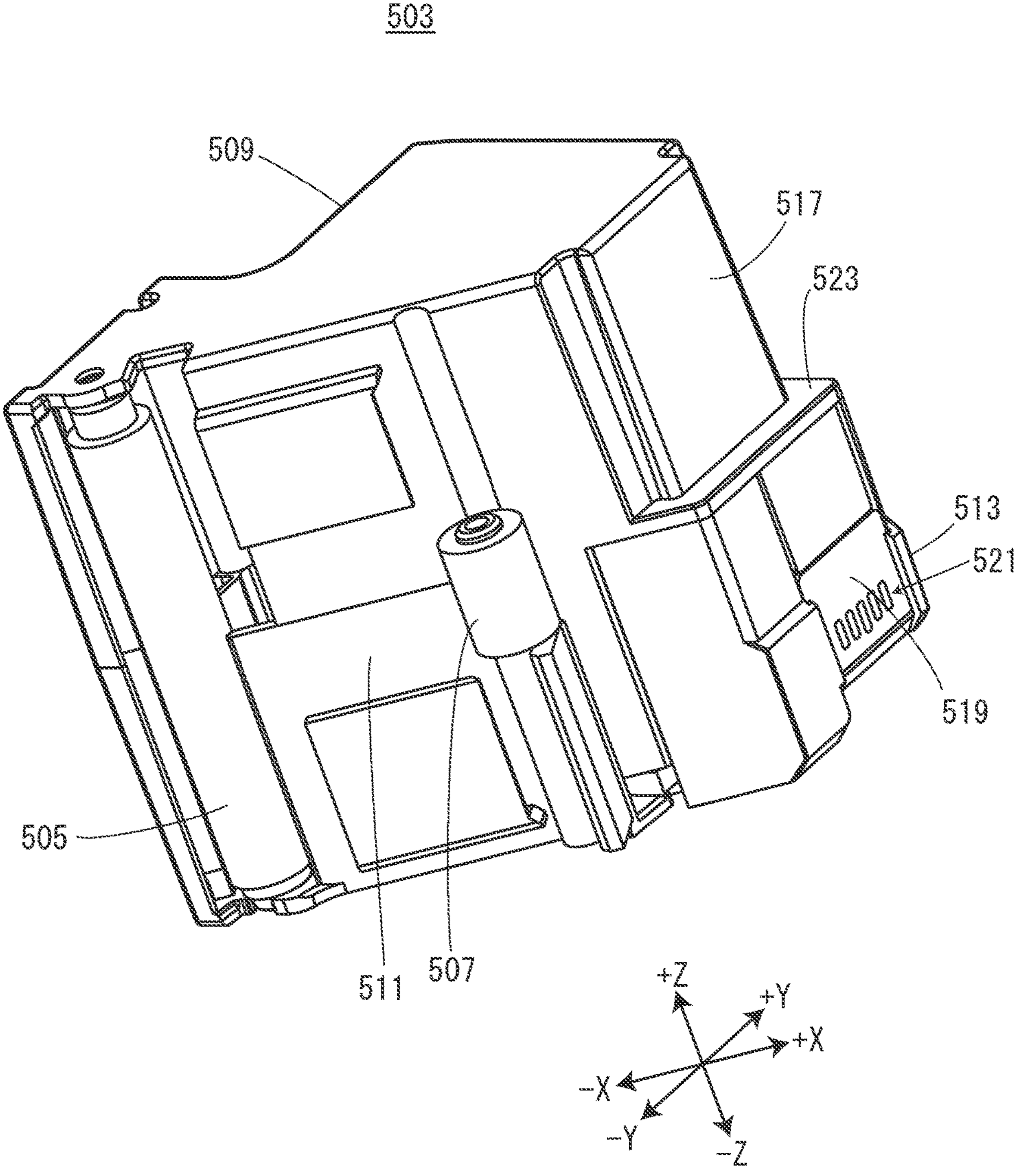
FIG. 29 is a perspective view of the tape guide cartridge.
Figure 30:
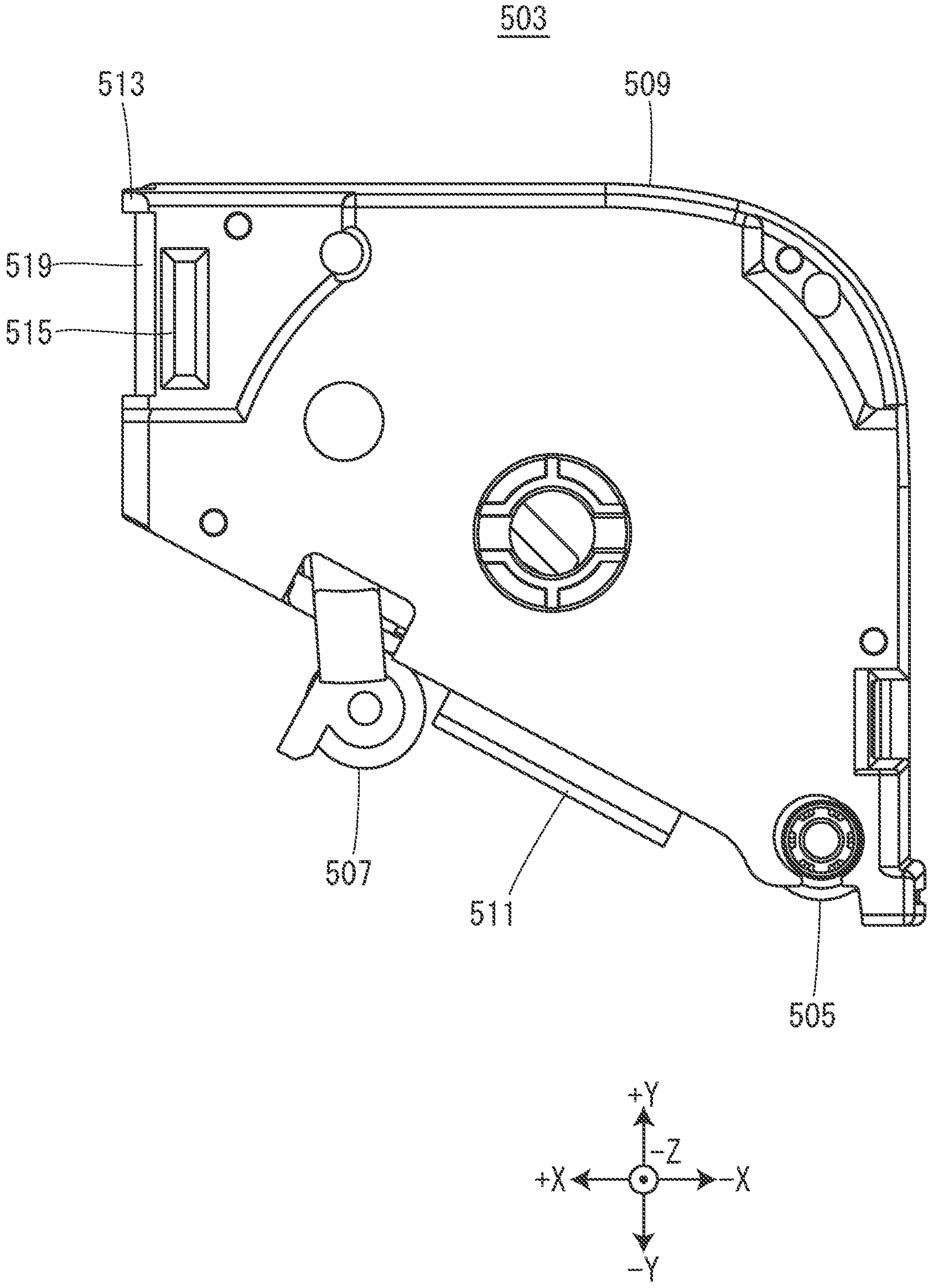
FIG. 30 is a view of the tape guide cartridge when seen from the back side in the installation direction.

As shown in FIGS. 28 to 30, the tape guide cartridge 503 includes a third platen roller 505, a tape sandwiching part 507, and a third cartridge case 509. Like the second platen roller 203, the third platen roller 505 sandwiches the second printing tape 403 between the third platen roller 505 and the printing head 55 and feeds the second printing tape 403. The tape sandwiching part 507 sandwiches the second printing tape 403 between the tape sandwiching part 507 and the peripheral wall part of the third cartridge case 509. The tape guide cartridge 503 is installed in the cartridge installation part 7 with the second printing tape 403 retained by the tape sandwiching part 507.

The third cartridge case 509 has a tape guide 511, a third substrate attachment part 513, a third convex-part reception part 515, and a fourth peripheral wall concave part 517. The tape guide 511 guides the second printing tape 403 that has been introduced from the device-side tape introduction port 9. Between the tape guide 511 and the peripheral wall part of the third cartridge case 509, a third tape path 512 to which the second printing tape 403 is fed is formed. The third substrate attachment part 513 is configured like the first substrate attachment part 167 or the second substrate attachment part 337. A third circuit substrate 519 configured like the first circuit substrate 165 or the second circuit substrate 327 is attached to the third substrate attachment part 513. When the tape guide cartridge 503 is installed in the cartridge installation part 7, the contact terminal parts 83 come in contact with a third electrode part 521 of the third circuit substrate 519. The third convex-part reception part 515 receives the engagement convex part 51 like the first convex-part reception part 159 or the second convex-part reception part 297. The fourth peripheral wall concave part 517 is configured like the fourth peripheral wall concave part 272 provided in the ribbon cartridge 201. That is, the surface on the front side in the installation direction of the fourth peripheral wall concave part 517 serves as a fourth pressing part 523 pressed by the fourth pressing protrusion 22 when the installation-part cover 5 is closed.

Cartridges are not limited to those having a configuration in which a printing tape or an ink ribbon is accommodated such as the tape cartridge 101 and the ribbon cartridge 201 of the present embodiment, but may only be required to have a configuration that allows the cartridges to be installed in the tape printing device 1.

The cartridge installation part 7 is not limited to a configuration in which the tape cartridge 101 and the ribbon cartridge 201 are alternatively installed, but may have a configuration in which only the ribbon cartridge 201 is installed.

Further, the above embodiments and the modified examples may be combined together.

[Supplementary Notes]

Hereinafter, a cartridge will be supplementally noted.

A cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge including: a tape path through which the printing tape introduced from the device-side tape introduction port is fed toward the device-side tape ejection port in a state in which the cartridge is installed in the cartridge installation part.

According to the configuration, the printing tape introduced into the device case from the device-side tape introduction port is fed to the device-side tape ejection port via the tape path. Thus, it is possible to smoothly feed the printing tape introduced from the outside of the tape printing device inside the tape printing device.

In this case, the cartridge preferably includes an ink ribbon accommodation part that accommodates an ink ribbon and a tape-retention-mechanism accommodation part that accommodates a tape retention mechanism that retains the printing tape introduced into the tape path, and the tape path is preferably provided between the ink ribbon accommodation part and the tape-retention-mechanism accommodation part.

According to the configuration, it is possible to constitute the tape path using the ink ribbon accommodation part and the tape-retention-mechanism accommodation part.

In this case, the cartridge preferably includes a cartridge case, and the cartridge case preferably includes a first case that constitutes a front side of the ink ribbon accommodation part in an installation direction of the cartridge, a second case that constitutes a front side of the tape-retention-mechanism accommodation part in the installation direction, and a third case that constitutes back sides of the ink ribbon accommodation part and the tape-retention-mechanism accommodation part in the installation direction.

According to the configuration, the first case and the third case are combined together to constitute the ink ribbon accommodation part. Further, the second case and the third case are combined together to constitute the tape-retention-mechanism accommodation part.

In this case, the tape path preferably has a set opening part that is used to set the printing tape in the tape path from a first width end surface that is one end surface in a width direction of the printing tape.

According to the configuration, a user is allowed to reset the printing tape in the tape path from the set opening part with the tip end of the printing tape projecting outward from the tape path even when the tip end of the printing tape is pulled in the tape path.

In this case, the tape path preferably has a first path lateral wall part and a second path lateral wall part that face each other, and includes a tape guide part that protrudes from the first path lateral wall part to the second path lateral wall part and guides a second width end surface that is the other end surface in the width direction of the printing tape.

According to the configuration, it is possible to guide the printing tape in the width direction of the printing tape by the tape guide part in the tape path.

In this case, the tape guide part preferably has a tape visual recognition part, and the tape visual recognition part preferably allows visual recognition of the printing tape set in the tape path from the set opening part through the tape visual recognition part.

According to the configuration, it is possible to cause the user to confirm whether the printing tape has been set at a position at which the visual recognition of the printing tape is allowed through the tape visual recognition part, i.e., at a position at which the second width end surface comes in contact with the tape guide part.

In this case, the second path lateral wall part preferably has a widened part widened to a side opposite to the first path lateral wall part at a position thereof facing the tape guide part.

According to the configuration, it is possible to prevent the tape guide part protruding from the first path lateral wall part from obstructing the printing tape when the user sets the printing tape in the tape path from the set opening part.

In this case, the cartridge further includes a movable guide part that comes close to the printing tape and is movable between a guide position at which the movable guide part guides the printing tape in a front-surface and rear-surface direction of the printing tape and a non-guide position separated from the guide position.

According to the configuration, it is possible to prevent the movable guide part from obstructing the printing tape by the movement of the movable guide part to the non-guide position when the user sets the printing tape in the tape path from the set opening part.

In this case, the cartridge preferably includes a cartridge case having a cartridge-side tape introduction port that introduces the printing tape introduced from the device-side tape introduction port into the tape path and a cartridge-side tape ejection port that ejects the printing tape toward the device-side tape ejection port, and the tape path preferably has an introduction-side path on a side closer to the cartridge-side tape introduction port than a platen roller and an ejection-side path on a side closer to the cartridge-side tape ejection port than the platen roller, the ejection-side path is preferably bent with respect to the introduction-side path, and the ejection-side path preferably has a bending angle of 21° or more and 42° or less with respect to the introduction-side path.

According to the configuration, the contact area between the printing tape and the platen roller is increased since the ejection-side path is bent at an angle of 21° or more with respect to the introduction-side path. Therefore, it is possible to stably feed the printing tape. Further, it is possible to prevent the printing tape from forming bending tendency since the ejection-side path is bent at an angle of 42° or less with respect to the introduction-side path.

EXPLANATION OF REFERENCE SYMBOLS

1: tape printing device
3: device case
7: cartridge installation part
9: device-side tape introduction port
11: device-side tape ejection port
55: printing head
201: ribbon cartridge
205: second ink ribbon
211: second cartridge case
233: ribbon-part front-side case
235: tape-retention-part front-side case
237: second back-side case
253: ink ribbon accommodation part
255: tape-retention-mechanism accommodation part
257: second tape path
257*a*: introduction-side path
257*b*: ejection-side path
258: set opening part
259: cartridge-side tape introduction port
261: cartridge-side tape ejection port
263: ribbon-side path lateral wall part
264: introduction-side guide part
265: tape-retention-mechanism-side path lateral wall part
266: tape visual recognition part
268: widened part
305: tape retention part
394: movable guide part
403: second printing tape
405: first width end surface
407: second width end surface
θ: bending angle

The invention claimed is:

1. A cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge comprising:

a tape path through which the printing tape introduced from the device-side tape introduction port is fed toward the device-side tape ejection port in a state in which the cartridge is installed in the cartridge installation part, and a cartridge case having a cartridge-side tape introduction port that introduces the printing tape introduced from the device-side tape introduction port into the tape path and a cartridge-side tape ejection port that ejects the printing tape toward the device-side tape ejection port, wherein the tape path has an introduction-side path on a side closer to the cartridge-side tape introduction port than a platen roller and an ejection-side path on a side closer to the cartridge-side tape ejection port than the platen roller, the ejection-side path is bent with respect to the introduction-side path, and the ejection-side path has a bending angle of 21° or more and 42° or less with respect to the introduction-side path.

2. The cartridge according to claim 1, comprising:

an ink ribbon accommodation part that accommodates an ink ribbon; and a tape-retention-mechanism accommodation part that accommodates a tape retention mechanism that retains the printing tape introduced into the tape path, wherein the tape path is provided between the ink ribbon accommodation part and the tape-retention-mechanism accommodation part.

3. The cartridge according to claim 2, comprising:

a cartridge case, wherein the cartridge case includes a first case that constitutes a front side of the ink ribbon accommodation part in an installation direction of the cartridge, a second case that constitutes a front side of the tape-retention-mechanism accommodation part in the installation direction, and a third case that constitutes back sides of the ink ribbon accommodation part and the tape-retention-mechanism accommodation part in the installation direction.

4. The cartridge according to claim 1, wherein the tape path has a set opening part that is used to set the printing tape in the tape path from a first width end surface that is one end surface in a width direction of the printing tape.

5. The cartridge according to claim 4, wherein the tape path has a first path lateral wall part and a second path lateral wall part that face each other, and includes a tape guide part that protrudes from the first path lateral wall part to the second path lateral wall part and guides a second width end surface that is the other end surface in the width direction of the printing tape.

6. The cartridge according to claim 5, wherein the tape guide part has a tape visual recognition part, and the tape visual recognition part allows visual recognition of the printing tape set in the tape path from the set opening part through the tape visual recognition part.

7. The cartridge according to claim 5, wherein the second path lateral wall part has a widened part widened to a side opposite to the first path lateral wall part at a position thereof facing the tape guide part.

8. The cartridge according to claim 4, comprising:

a movable guide part that comes close to the printing tape and is movable between a guide position at which the movable guide part guides the printing tape in a front-surface and rear-surface direction of the printing tape and a non-guide position separated from the guide position.

* * * * *